US006686529B2

(12) United States Patent
Kim

(10) Patent No.: US 6,686,529 B2
(45) Date of Patent: Feb. 3, 2004

(54) METHOD AND APPARATUS FOR SELECTING HARMONIC COLOR USING HARMONICS, AND METHOD AND APPARATUS FOR CONVERTING SOUND TO COLOR OR COLOR TO SOUND

(75) Inventor: Gir-Ho Kim, Seongnam-si (KR)

(73) Assignee: Harmonicolor System Co., Ltd., Seoul (KR)

( * ) Notice: Subject to any disclaimer, the term of this patent is extended or adjusted under 35 U.S.C. 154(b) by 0 days.

(21) Appl. No.: 10/078,561

(22) Filed: Feb. 18, 2002

(65) Prior Publication Data

US 2002/0114511 A1 Aug. 22, 2002

(51) Int. Cl.[7] .................................................. G10G 1/00
(52) U.S. Cl. .................... 84/464 R; 84/477 R; 345/716; 345/727
(58) Field of Search ............................. 84/464 R, 464 A, 84/477 R, 600, 639; 345/716, 727; G06T 11/00, 1/00

(56) References Cited

U.S. PATENT DOCUMENTS

| | | | | |
|---|---|---|---|---|
| 3,990,105 A | * | 11/1976 | Fast | 381/56 |
| 4,378,466 A | * | 3/1983 | Esser | 345/22 |
| 4,768,086 A | * | 8/1988 | Paist | 381/56 |
| 5,005,459 A | * | 4/1991 | Adachi et al. | 84/453 |
| 5,191,319 A | * | 3/1993 | Kiltz | 345/73 |
| 5,359,341 A | * | 10/1994 | Hutchings | 345/45 |
| 5,689,078 A | * | 11/1997 | McClard | 84/600 |
| 6,021,204 A | * | 2/2000 | Eastty | 381/12 |
| 6,046,724 A | * | 4/2000 | Hvass | 345/600 |
| 6,225,545 B1 | * | 5/2001 | Suzuki et al. | 84/477 R |

FOREIGN PATENT DOCUMENTS

| | | | | |
|---|---|---|---|---|
| JP | 63-184875 | * | 7/1988 | G06F/15/62 |
| JP | 03-134697 | * | 6/1991 | G09G/5/00 |
| JP | 10320570 A | * | 12/1998 | G06T/11/00 |
| WO | wo 81/00637 | * | 3/1981 | G01G/1/00 |

* cited by examiner

Primary Examiner—Robert E. Nappi
Assistant Examiner—David Warren
(74) Attorney, Agent, or Firm—Harness, Dickey & Pierce, P.L.C.

(57) ABSTRACT

Disclosed is a method and an apparatus for converting sound/color or color/sound, and more particularly to a method and an apparatus capable of converting a sound into a color image or an image into a sound, by selecting the harmonic color exactly tuned with an optional reference color based on the harmonics, and frequency converting a sound or a color having a characteristic of wave. A method of selecting a harmony color using harmonics, the method comprises the steps of: selecting the musical scale degree dividing rate and a harmonics code; selecting a reference color; operating a luminance of the selected reference color; determining an octave corresponding to the luminance; and operating a frequency of the harmonic color from the referenced frequency by reference to a harmony frequency ratio of the selected harmonics code, in response to a scale degree frequency ratio in the determined octave, and, if the operated harmonic color is deviated from a band of visible frequency, converting the harmonic frequency into the band of visible frequency.

29 Claims, 27 Drawing Sheets

(13 of 27 Drawing Sheet(s) Filed in Color)

| TONE | | SCALE | TEMPERAMENT | JUST | HARMONIC FREQUENCY RATE |
|---|---|---|---|---|---|
| | | C | 1 | 1 | 0 |
| UNISON | | C# | $^{12}\sqrt{2}$ | $\dfrac{5\,(\sqrt[4]{5})^{3}}{16}$ | 1 |
| 2$^{ND}$ MAJOR | | D | $(^{12}\sqrt{2})^{2}$ | $\dfrac{(\sqrt[4]{5})^{2}}{2}$ | 2 |
| 2$^{ND}$ MINOR | | Eb | $(^{12}\sqrt{2})^{3}$ | $\dfrac{4}{(\sqrt[4]{5})^{3}}$ | 3 |
| 3$^{RD}$ MINOR | | E | $(^{12}\sqrt{2})^{4}$ | 5/4 | 4 |
| 3$^{RD}$ MAJOR | | F | $(^{12}\sqrt{2})^{5}$ | $\dfrac{2}{(\sqrt[4]{5})}$ | 5 |
| 4$^{TH}$ MINOR | | F# | $(^{12}\sqrt{2})^{6}$ | $\dfrac{5\,(\sqrt[2]{5})}{8}$ | 6 |
| 4$^{TH}$ MAJOR | | G | $(^{12}\sqrt{2})^{7}$ | 3/2 | 7 |
| 6$^{TH}$ MINOR | | Ab | $(^{12}\sqrt{2})^{8}$ | $\dfrac{1}{(\sqrt[2]{5})}$ | 8 |
| 4$^{TH}$ MAJOR | | A | $(^{12}\sqrt{2})^{9}$ | $\dfrac{(\sqrt[4]{5})^{3}}{2}$ | 9 |
| 7$^{TH}$ MINOR | | Bb | $(^{12}\sqrt{2})^{10}$ | $\dfrac{4}{(\sqrt[4]{5})^{2}}$ | 10 |
| 7$^{TH}$ MAJOR | | B | $(^{12}\sqrt{2})^{11}$ | $\dfrac{(\sqrt[4]{5})^{5}}{4}$ | 11 |
| OCTAVE | | C1 | 2 | 2 | 12 |

FIG.4
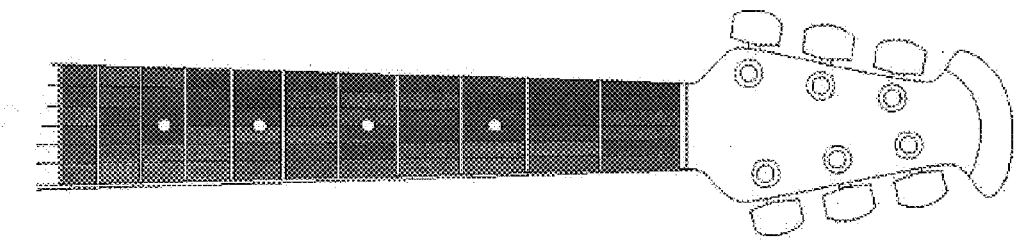
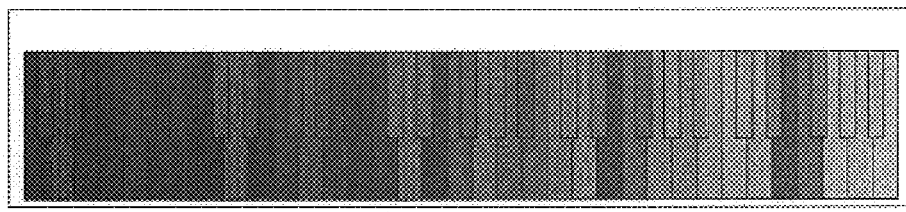
FIG.5
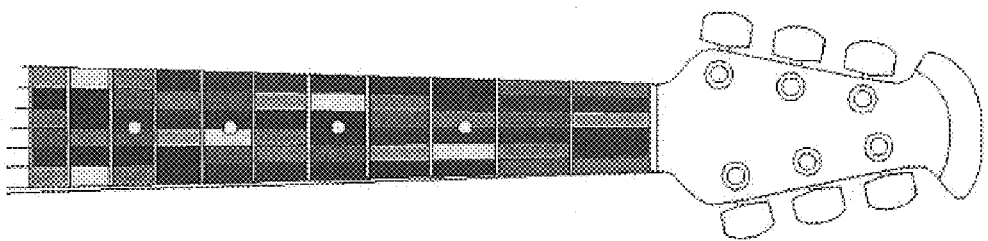
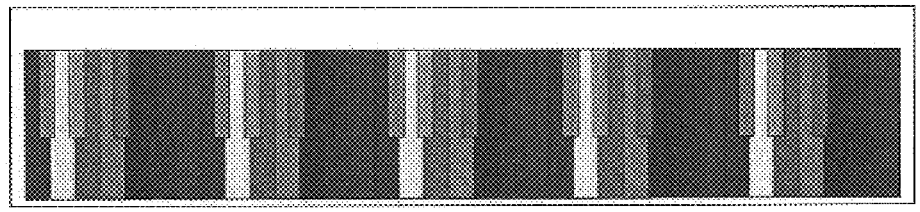

FIG. 7

| TONE | SCALE | TEMPERAMENT | JUST | HARMONIC FREQUNCY RATE |
|---|---|---|---|---|
| | C | 1 | 1 | 0 |
| UNISON | C# | $\sqrt[12]{2}$ | $\dfrac{5(\sqrt[4]{5})^3}{16}$ | 1 |
| 2$^{ND}$ MAJOR | D | $(\sqrt[12]{2})^2$ | $\dfrac{(\sqrt[4]{5})^2}{2}$ | 2 |
| 2$^{ND}$ MINOR | Eb | $(\sqrt[12]{2})^3$ | $\dfrac{4}{(\sqrt[4]{5})^3}$ | 3 |
| 3$^{RD}$ MINOR | E | $(\sqrt[12]{2})^4$ | $5/4$ | 4 |
| 3$^{RD}$ MAJOR | F | $(\sqrt[12]{2})^5$ | $\dfrac{2}{(\sqrt[4]{5})}$ | 5 |
| 4$^{TH}$ MINOR | F# | $(\sqrt[12]{2})^6$ | $\dfrac{5(\sqrt[2]{5})}{8}$ | 6 |
| 4$^{TH}$ MAJOR | G | $(\sqrt[12]{2})^7$ | $3/2$ | 7 |
| 6$^{TH}$ MINOR | Ab | $(\sqrt[12]{2})^8$ | $\dfrac{1}{(\sqrt[2]{5})}$ | 8 |
| 4$^{TH}$ MAJOR | A | $(\sqrt[12]{2})^9$ | $\dfrac{(\sqrt[4]{5})^3}{2}$ | 9 |
| 7$^{TH}$ MINOR | Bb | $(\sqrt[12]{2})^{10}$ | $\dfrac{4}{(\sqrt[4]{5})^2}$ | 10 |
| 7$^{TH}$ MAJOR | B | $(\sqrt[12]{2})^{11}$ | $\dfrac{(\sqrt[4]{5})^5}{4}$ | 11 |
| OCTAVE | C1 | 2 | 2 | 12 |

FIG.8

| CODE | Harmony Frequency | | |
|---|---|---|---|
| Major | 4 | 7 | |
| Major7th | 4 | 7 | 10 |
| Major6th | 4 | 7 | 9 |
| Major7 | 4 | 7 | 11 |
| Minor | 3 | 7 | |
| Minor7th | 3 | 7 | 10 |
| Minor6th | 3 | 7 | 9 |
| MinorMajor7 | 5 | 8 | 11 |
| Diminish | 3 | 6 | 9 |
| Augment | 4 | 8 | |
| Sus4 | 5 | 7 | |
| 7Sus4 | 5 | 7 | 10 |

● PROPORTION TO MAGNITUDE OF SOUND PRESSURE

METHOD AND APPARATUS FOR SELECTING HARMONIC COLOR USING HARMONICS, AND METHOD AND APPARATUS FOR CONVERTING SOUND TO COLOR OR COLOR TO SOUND

BACKGROUND OF THE INVENTION

1. Field of the Invention

The present invention relates to a method and an apparatus for selecting a harmonic color using the harmonics, and a method and an apparatus for converting sound to color or color to sound, and more particularly to a method and an apparatus capable of converting a sound into a color image or an image into a sound, by selecting the harmonic color exactly tuned with an optional reference color based on the harmonics, and frequency conversion of a sound or a color having a characteristic of wave.

2. Description of the Related Art

According to the popularization of color due to the color television broadcasting, the economical value of the color is increased. Accordingly, it is very important for web designers, artists, architects, interior decorators, industrial designers, landscape architects, dress designers, stage directors, creators of various fields, and purchasers to select the harmonic color.

The term 'color harmony' means two or more colors are used in close to each other to give a good effect.

According to the conventional color harmony, the harmony color is selected by reference to a book printed in a color of which an optional reference color is printed and the harmony colors harmonizing with the reference color are printed as a natural color based on visual experience of human. The standard of representative color harmony is a Coloring Book, a Munsell Colorimetric System, and CIE Standard Colorimetric system.

However, the conventional lacks of objectivity in that the method is based on the human experience or the experiment. Because the harmony color is selected by the visible sense by reference to the printed reference material, the accuracy of the color may be reduced. In addition, it is impossible to use the printed reference for a Desk Top Publishing system using a computer.

In a converting method sound to color deriving the harmony color from the harmony music, the color and the sound are different to the band of frequency adapted to the sense of sight and hearing, but are identical to the property of physical wave. However, it has not been studied on the reversible conversion of the color and the sound.

The conventional sound pressure displaying apparatus which is representative of a graphic equalizer visualizing the change of the sound displays only magnitude of the sound pressure each a band of frequency, thereby providing a disadvantage of simply displaying the image and limiting the application range.

U.S. Pat. No. 6,046,724 issued to Havass discloses a method and an apparatus for the conversion of sound waves to light. According to the Havass patent, the light matching a sound is displayed by controlling three color light sources of RGB based on each frequency and the magnitude of the sound through 6 filter means corresponding from 3 octave to 8 octave.

SUMMARY OF THE INVENTION

Therefore, a major object of the invention is to solve the problems involved in the related art, and to provide a method and an apparatus capable of selecting the harmonic color exactly tuned with an optional reference color based on the harmonics.

Other object of the invention is to provide a sound/color converting table capable of easily seeing the conversion of sound and color, in which 12 musical scale degrees and 12 color system corresponding to 10 octave and 10 luminance are arranged on a first coordinate axis in a relationship of 1:1.

The other object of the invention is to provide a musical instrument capable of recognizing the color in a scale degree by coloring the scale degree position based on the sound/color converting table.

Another object of the invention is to provide objective and credible systematic frequency conversion criterion using wave of color and sound, that is, frequency characteristics to provide a method and an apparatus capable of converting a sound into a color image or an image into a sound by converting visual and audible frequency into audible and visual frequency based on the above criterion.

Still another object of the invention is to provide a method and an apparatus of determining a sound source position to display the stereo sound source position in sound/color conversion.

The other object of the invention is to provide a musical instrument capable of recognizing the color in a scale degree by coloring the scale degree position based on the sound/color converting table.

The musical scale degree dividing rate is any one of an average rate or a just temperament. In case of average rate, the harmony color can be obtained as following equation:

$$F_h = F_r \times (\sqrt[k]{2})^n$$

wherein, Fh denotes a harmony frequency to be obtained, Fr denotes an input frequency, k denotes the number of the musical scale degree which is resulted from dividing a frequency of one octave by a constant rate, n denotes a harmony frequency ratio and $1 \leq n \leq (k-1)$, in which k and n are natural number.

In other aspect of the present invention, there is provided an apparatus of selecting a harmony color comprising: means for selecting the musical scale degree dividing rate, a harmonics code, and a reference color; means for storing a table of the harmony frequency ratio of the harmony scale degree by the harmonics code according to the musical scale degree dividing rate; means for operating a luminance of the selected reference color, determining an octave corresponding to the luminance, and operating a frequency of the harmonic color from the referenced frequency by reference to a harmony frequency ratio of the selected harmonics code in the table, and, if the operated harmonic color frequency is deviated from a band of visible frequency, converting the harmonic color frequency into the band of visible frequency and then displaying the operated harmonic color frequency as the referenced harmonic color.

In the other aspect of the present invention, there is provided a sound/color converting table, wherein 12 musical scale degrees and 12 color system as 12 equivalent width are arranged on a first coordinate axis in a relationship of 1:1 by setting 'do' of musical scale degree and 'red' of a color system to an original point of the coordinates, and 10 octaves and 10 luminance are arranged on a second coordinate axis in relationship of 1:1. The sound/color converting table is any one of circular coordinate system and orthogonal coordinate system. A 'red' of the color system has a wavelength of which 'do, mi, sol' of the musical scale degree is approximate to 'red, green, blue' of the color system.

The circular coordinate system is set that the first coordinate axis is in a direction of circumference, and the second coordinate axis is in a direction of a center of circle.

The orthogonal coordinate system is made in such a way that the luminance is in direct proportion to the musical scale degree.

In another aspect of the present invention, there is provided a musical instrument which corresponds to the musical scale degree position being colored by a sound/color converting table.

In still another aspect of the present invention, there is provided a method of converting a sound to a color, the method comprising the steps of: Fourier-transform of sound source; sampling at least one signal of particular audible frequency among the Fourier-transformed signals; converting at least one sampled signal of the audible frequency into a signal of a visible frequency using following equation; and displaying a color corresponding to at least one converted visible frequency:

$$F=F_l \times 2^{x*}$$

$$B_F \propto x$$

wherein, $$x = \log_2\left(\frac{f_i}{f_l}\right) + C',$$

F is a visible frequency to be obtained, Fl is a reference visible frequency, a positive number of x is a value of octave, BF is a luminance of color, x* is places of decimals and denotes a height of sound in one octave, fi is a sampled audible frequency, fl is a reference audible frequency, C' is a constant and denotes a real number between $0 \leq C' \leq 1$.

The sampling step includes the steps of inputting the Fourier-transformed signal every a constant time interval in a frame; obtaining one or more peak values every a frame; classifying the obtained peak values in order of sound pressure level; and obtaining the desired number of peak values in order of sound pressure level.

The displaying step displays an image colored with the converted color and having a magnitude in proportion to a sound pressure of each peak value at a frequency position of each sampled peak value. The displaying step displays an image colored with the converted color and having motions of animation in proportion to a sound pressure of each peak value at each position of the animation corresponding to a frequency of each sampled peak value. The displaying step overlaps and displays each overlapping image having a magnitude in proportion to a sound pressure of every peak value at a desired position.

In still another aspect of the present invention, there is provided a method of converting a sound to a color, the method comprising the steps of: Fourier-transforming a number of inputted sound sources through a number of channels; sampling at least one signal of particular audible frequency among the Fourier-transformed signals; deriving a sound source position between a number of channels using the signals of audible frequency corresponding to each other; converting at least one sampled signal of the audible frequency among a number of sampled signal into a signal of a visible frequency; and displaying a color corresponding to at least one converted visible frequency according to a frequency and sound position:

The sound source generating position in the sound source input position of a number of channels is operated as following equation:

$$I_{diff} = k\left(\frac{1}{s^2 + a^2} - \frac{1}{s^2 + (d-a)^2}\right)$$

wherein, a is a value of sound source generating position to be obtained by setting the sound source input position of a first channel to zero, d is a distance from the sound source input position of the first channel to the sound source input position of a second channel, s is a distance extending at right angle from a straight line extending between the sound source input positions of two channels to the actual sound source, k is a constant of k>0, and Idiff is a sound pressure value of the first channel minus a sound pressure value of the second channel at a particular peak.

In still another aspect of the present invention, there is provided an apparatus of converting a sound into a color, the apparatus comprising: means for inputting the sound; means for amplifying the input sound; means for Fourier-transforming the amplified sound; means for sampling at least one signal of particular audible frequency among the Fourier-transformed signals; means for converting at least one sampled signal of the audible frequency into a signal of a visible frequency; and means for displaying a color corresponding to at least one converted visible frequency.

In still another aspect of the present invention, there is provided an apparatus of converting a sound into a color, the apparatus comprising: means for Fourier-transforming a number of inputted sound sources through a number of channels; means for amplifying the input sound; means for Fourier-transforming the amplified sound; means for sampling at least one signal of particular audible frequency among the Fourier-transformed signals; means for operating a sound source position between a number of channels using the signals of audible frequency corresponding to each other; means for converting at least one sampled signal of the audible frequency into a signal of a visible frequency; and means displaying a color corresponding to at least one converted visible frequency from every a audible frequency according to sound position.

The displaying means is any one of a display appliance such as CRT and LCD, a full color display lamp, an illumination unit such as a color laser light source apparatus.

In still another aspect of the present invention, there is provided a method of converting a color into a sound, the method comprising: obtaining a visible frequency Fi and a luminance BFi corresponding to an input color; converting the obtained visible frequency into a audible frequency by following equation; and outputting the converted audible frequency in a sound:

$$f=f_l \times 2^{x+BFi}$$

wherein, $$x = \log_2\left(\frac{F_i}{F_l}\right) + C,$$

f is a visible frequency to be obtained, fl is a reference visible frequency, a positive number of x is a value of octave, BFi is a luminance of Fi and denotes a constant between $1 \leq BFi \leq 10$, and C is a constant and denotes a real number between $0 \leq C' \leq 1$ determined by the reference frequency.

In still another aspect of the present invention, there is provided an apparatus of converting a color into a sound, the apparatus comprising: means for obtaining a visible frequency Fi and a luminance BFi corresponding to an input color; means for converting the obtained visible frequency into a audible frequency; and means for outputting the converted audible frequency in a sound:

In still another aspect of the present invention, there is provided a method of sampling a position of a sound source, the method comprising: inputting a sound obtained from a number of channels spaced apart in a constant interval; Fourier-transforming the inputted sound through each channel; sampling a peak value of the Fourier-transformed signal; and operating a sound source generating position between a number of channels using a sound pressure of a number of channels at each sampled frequency.

The sound source generating position between the sound source input position of a number of channels is operated as following equation:

$$I_{diff} = k\left(\frac{1}{s^2 + a^2} - \frac{1}{s^2 + (d-a)^2}\right)$$

wherein, a is a value of sound source generating position to be obtained by setting the sound source input position of a first channel to zero, d is a distance from the sound source input position of the first channel to the sound source input position of a second channel, s is a distance extending at right angle from a straight line extending between the sound source input positions of two channels to the actual sound source, k is a constant of k>0, and Idiff is a sound pressure value of the first channel minus a sound pressure value of the second channel at a particular peak.

The sound source generating position between the sound source input position of a number of channels is operated as following equation:

$$E\text{diff} = M1\text{energy} - M2\text{energy}$$

If Ediff>0, the sound source generating position is close to the first channel,

If Ediff<0, the sound source generating position is close to the second channel, $$\text{Energy} = \Sigma(P1^2 + P2^2 + \ldots Pn^2)$$

wherein, Ediff is a value of the sound source generating position with the middle position between two channels being zero, Pn is a value of sound pressure level having a detected peak, n is the number of detected peak, M1energy is a value of sound pressure energy of the first channel, and M2energy is a value of sound pressure energy of the second channel.

In still another aspect of the present invention, there is provided an apparatus of selecting a position of a sound source, the apparatus comprising: means for inputting a sound from the sound source through a number of channels spaced apart in a constant interval; means for Fourier-transforming the inputted sound through each channel; means for sampling a peak value of the Fourier-transformed signal; and means for operating a sound source generating position between a number of channels using a sound pressure of each selected sample obtained from a number of channels.

BRIEF DESCRIPTION OF THE DRAWINGS

The file of this patent contains at least one drawing executed in color. Copies of this patent with color drawings will be provided by the Patent and Trademark Office upon request and payment of necessary fee.

The above object, and other features and advantages of the present invention will become more apparent after a reading of the following detailed description when taken in conjunction with the drawings, in which:

FIGS. 4 and 5 show musical instruments of which the position of the musical scale degree is colored based on the sound/color converting table according to the present invention;

FIG. 7 shows the first table illustrating the musical scale degree dividing rate and a harmony frequency ratio;

FIG. 8 shows the second table illustrating the harmony frequency ratio corresponding to the harmonics code;

DETAILED DESCRIPTION OF THE PREFERRED EMBODIMENT

Hereinafter, the present invention will be described with respect to the preferred embodiment illustrated in the annexed drawings.

Figure 1:
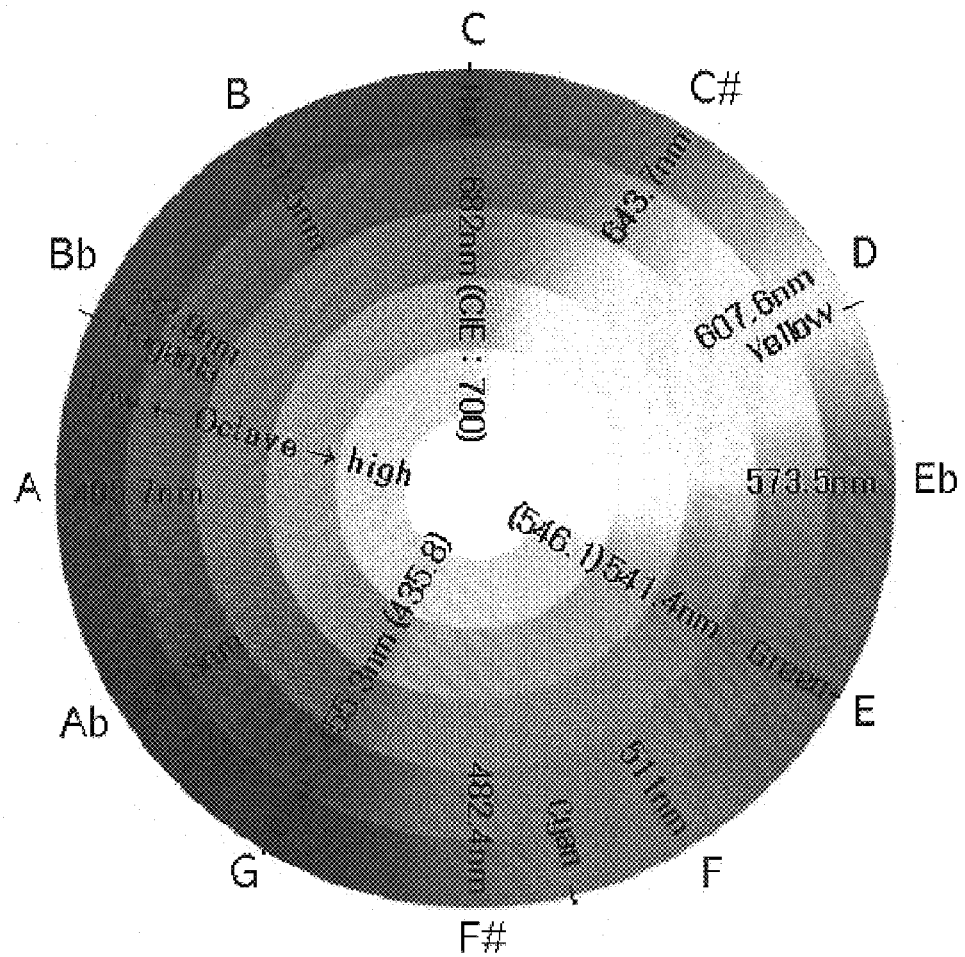
FIG. 1 is a table of converting sound to color, of which is a circle coordinate according to the present invention.

FIG. 1 is a table of converting sound to color, of which is a circle coordinate according to the present invention. FIG. 1 illustrates one example in that each of 12 musical scale degrees of harmonics is represented to a color, for example, 'do' tone (indicated by 'C' in FIG. 1) being corresponding to red (682 nm). As will be seen from FIG. 1, the color is arranged in such a way that a value logarithmically taken by a visible frequency from a low frequency is in direct proportion to an angle by reference to the position, on which 'do' tone is positioned, as zero. The color is represented in order of red, orange, yellow, green, blue and purple. The number of musical scale degree (in order words, it is number in that a band of frequency of an octave is logarithmically divided) are arranged based on 12 musical scale degrees represented by do (C), do# (C#), re (D), re# (Eb), me (E), fa (F), fa# (F#), sol (G), sol#(Ab), Ia (A), la#(Bb) and Ci (B). The luminance of color system and the octave of musical scale degree are arranged in 1:1 corresponding relationship. Accordingly, the luminance and the octave rise toward the center of circle, and lower from the center of circle.

Figure 2:
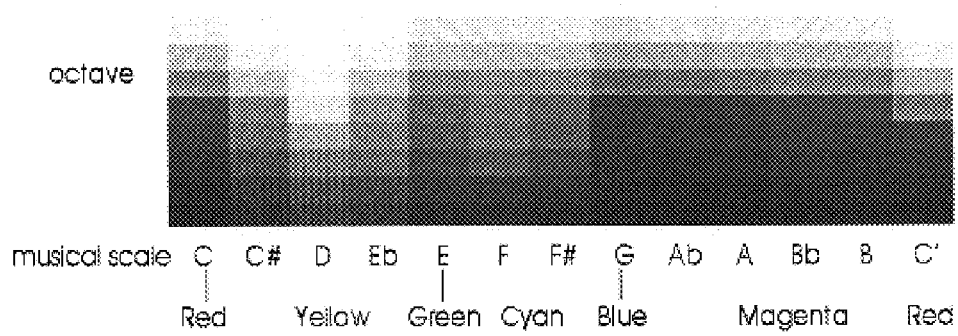
FIG. 2 shows the first sound/color converting table of an orthogonal coordinate system according to the present invention.

FIG. 2 shows the first sound/color converting table of an orthogonal coordinate system according to the present invention. A horizontal axis of the first sound/color converting table indicates a sound tone and a color, while a vertical axis thereof indicates an octave and a luminance. In the first sound/color converting table a saturation of the color is changed in direct proportion to the sound tone. Accordingly, in the same octave, the luminance of colors is different, while the saturation is identical.

Figure 3:
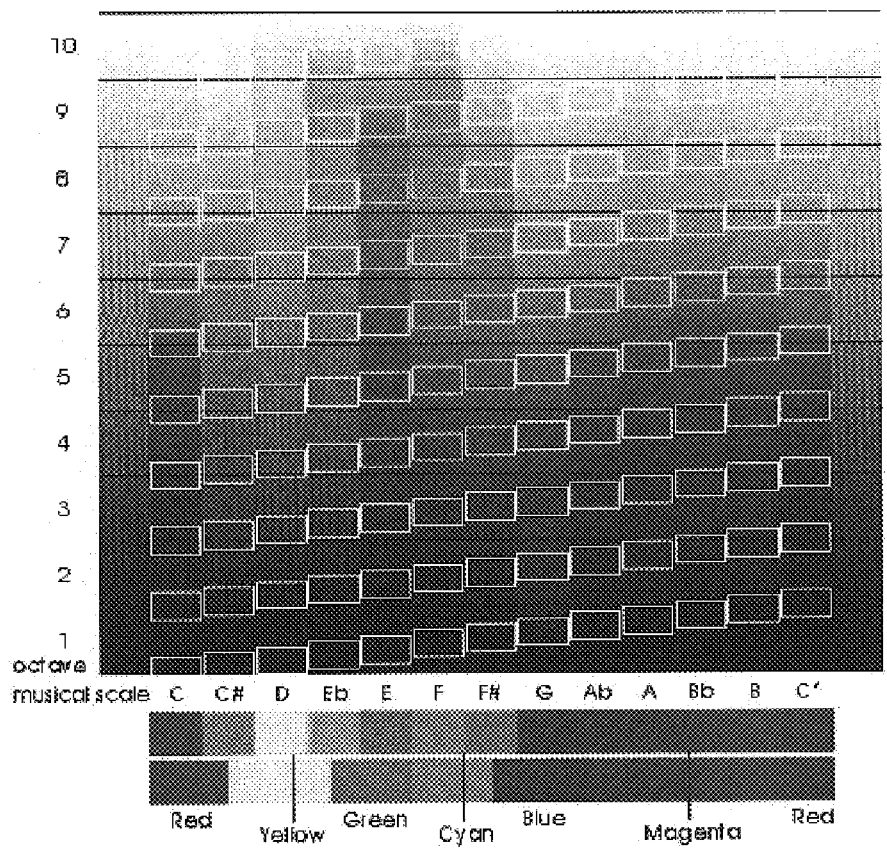
FIG. 3 shows the second sound/color converting table of an orthogonal coordinate system according to the present invention.

FIG. 3 shows the second sound/color converting table of an orthogonal coordinate system according to the present invention. A horizontal axis of the second sound/color converting table indicates a sound tone and a color, while a vertical axis thereof indicates an octave and a luminance. In the second sound/color converting table the luminance of the color is changed in direct proportion to the sound tone. Accordingly, in a horizontal direction, the luminance of colors is identical, while the saturation is different.

FIGS. 4 and 5 show musical instruments of which the position of the musical scale degree is colored based on the sound/color converting table according to the present invention. FIG. 4 shows a case where the position of the scale degree of a guitar and a piano is colored based on the second sound/color converting table that the sound tone is in proportion to the luminance. FIG. 5 shows a case where the musical instruments are colored based on the first sound/color converting table.

According to the musical instruments adopted the principle of the present invention, a player can recognize the musical scale degree position using the color, thereby distinguishing the octave of the musical scale degree and the sound tone.

Figure 6:
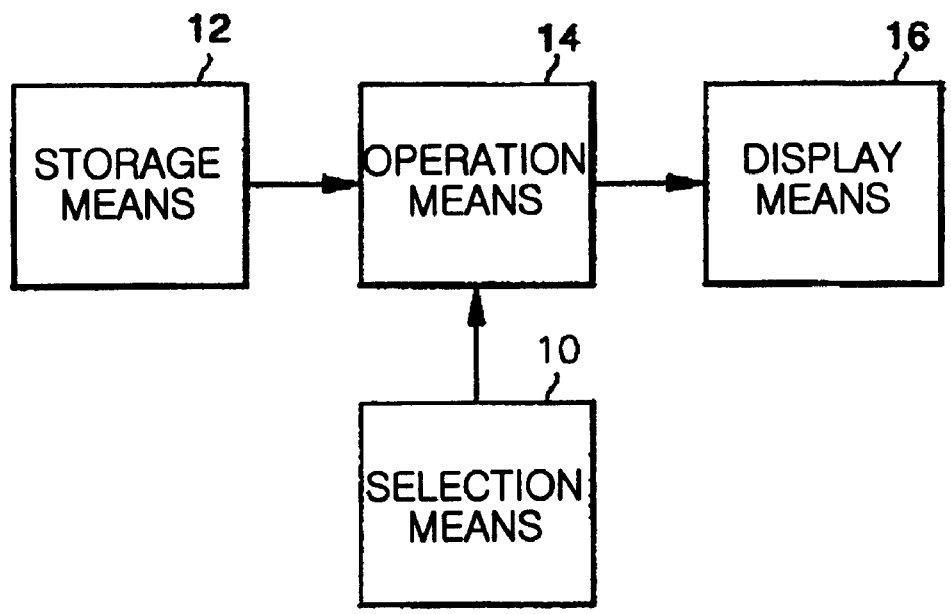
FIG. 6 is a block diagram of a harmony color selection apparatus according to the present invention.

FIG. 6 is a block diagram of a harmony color selection apparatus according to the present invention, the apparatus comprising selection means 10, storage means 12, operation means 14, and display means 16.

The selection means 10 selects a reference color for searching for a harmony color, and selects a scale degree dividing rate and a harmonics code.

The storage means 12 stores the first and the second table of FIGS. 7 and 8. FIG. 7 shows the first table illustrating the musical scale degree dividing rate and a harmony frequency ratio, and FIG. 8 shows the second table illustrating the harmony frequency ratio corresponding to the harmonics code.

If the scale degree dividing rate is selected as an average ratio, the operation means 14 operates the harmony color as following:

$$F_h = F_r \times (\sqrt[k]{2})^n$$

wherein, Fh denotes a harmony frequency to be obtained, Fr denotes an input frequency, k denotes the number of musical scale degree which is resulted from dividing a frequency of one octave by a constant rate, n denotes a harmony frequency ratio and $1 \leq n \leq (k-1)$, in which k and n are natural number.

Generally, since 12 musical scale degrees is used, it will now be explained a case in that k is 12, and n is from 1 to 11. In the above equation, since k is 12, $\sqrt[12]{2}$ is about 1.0594, and is a ratio of adjacent frequencies when the frequency of one octave is divided by a log ratio of constant interval. Specifically, in the tone, when a tone of one octave is divided by 12 scale degrees, the frequency ratio is identical with that of adjacent tone (for example, 'do' and 'do#').

Thus, the harmony frequency ratio n means a constant ratio of interval consisting of a particular code, for example, in a major code consisting of 'do, mi', sol', since a constant ratio interval of frequencies corresponding to 'mi' tone and 'sol' tone is 4 and 7, respectively, by reference to the frequency corresponding to 'do' tone, the value of harmony frequency ratio of the major code in the table is denoted by 4 and 7. Therefore, in case that the input frequency is corresponding to 'do' tone, a number of harmony frequencies harmonizing with the input frequency becomes a frequency corresponding to 'mi' tone and 'sol' tone, respectively.

If the input frequency applied from input means 11 is about 690 Thz (435 nm of wavelength) corresponding to blue, the harmony frequency corresponding to a minor code can be operated as following. Since the harmony frequency ratio n is 3 and 7, respectively, $F_{h1}=690\times(\sqrt[12]{2})^3$ THZ= 820.55 THz (365.61 nm of wavelength), and $F_{h2}=690\times(\sqrt[12]{2})^7$ THz=1033.83 THz (290.18 nm of wavelength).

Since Fh2 is out of the range of visible frequency, if the operated harmony frequency is out of the range of visible frequency, the first operation unit 17 divides the operated harmony by 2 to prevent the harmony frequency from being out of the range of visible frequency. Accordingly, Fh2 becomes 516.92 Thz (580.36 nm) which is divided by 2.

Also, in conventional 12 musical scale degrees of average rate, if a frequency of one octave is divided by a constant interval of log ratio, the frequency interval with adjacent tone is identical as $(^{12}\sqrt{2})^1$ at any tone. However, in case of the just temperament, since a next tone is made in a fractional type by reference to 'do' tone, the frequency interval is not constant with that of the adjacent tone. However, since the just temperament is superior to the average ratio, it has been used.

In case of dividing the musical scale degree by the just temperament, in order to operate the harmony frequency, a frequency ratio of fractional type corresponding to the harmony frequency ratio (referred to as a just temperament frequency ratio) n is derived by reference to a main frequency (a frequency corresponding to 'do' tone). FIG. 7 shows the just temperament frequency ratio corresponding to each the musical scale degree by reference to the main frequency.

For example, if the input frequency applied from the input means 11 is 460 Thz corresponding to red, and the harmony frequency ratio n derived from the table 1 by selecting the major code is 4 and 7, respectively, the just temperament frequency ratio corresponding to 4 and 7 of harmony frequency ratio is 5/4 and 3/2, respectively, and thus, Fh1= 460×5/4 Thz=575 Thz, Fh2=460×3/2 Thz=690 Thz.

The display means 16 converts the inputted harmony frequency into a visible ray, and displays the harmony color on a screen of a monitor.

Figure 9:
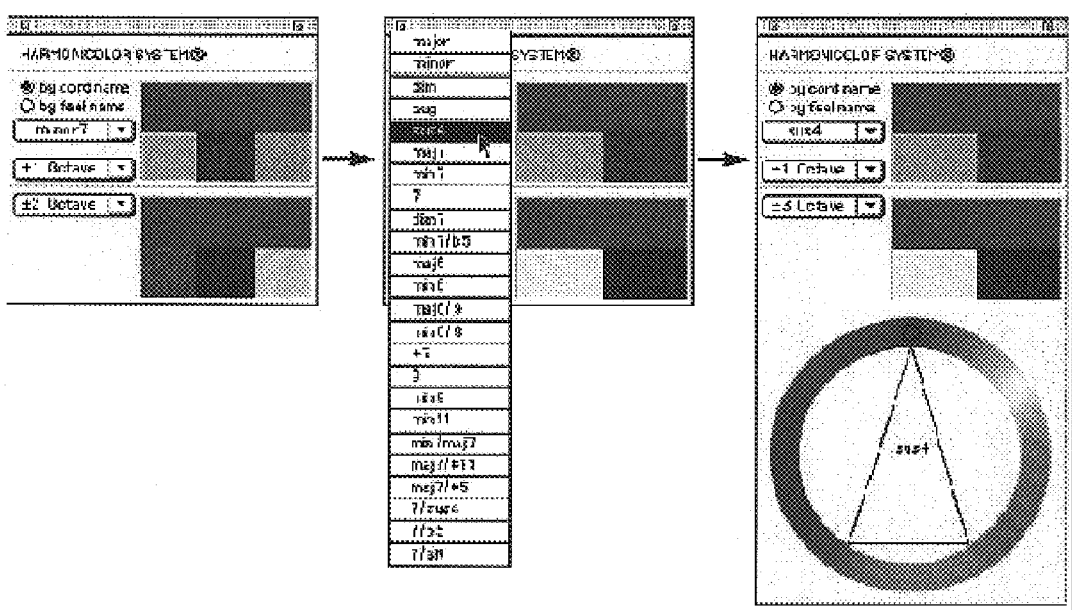
FIG. 9 shows a state displayed on a monitor of a computer for explaining one example of a method for selecting the harmony color according to the present invention.

FIG. 9 shows a state displayed on a monitor of a computer for explaining one example of a method for selecting the harmony color according to the present invention. As shown in FIG. 9, if a user clicks a harmonics code list on a left window, the harmonics code list displays on a center window. For example, if the user selects a 'SUS4 ' code on the displayed harmonics code list, 3 harmony colors are displayed in a ±1 octave and a ±3 octave selected on a right window, respectively, and a harmony frequency geometry of 'SUS4' is displayed on a hue circle. If the user selects a reference color on the hue circle, the related harmony colors on the harmony color display window are changed and displayed.

Figure 10:
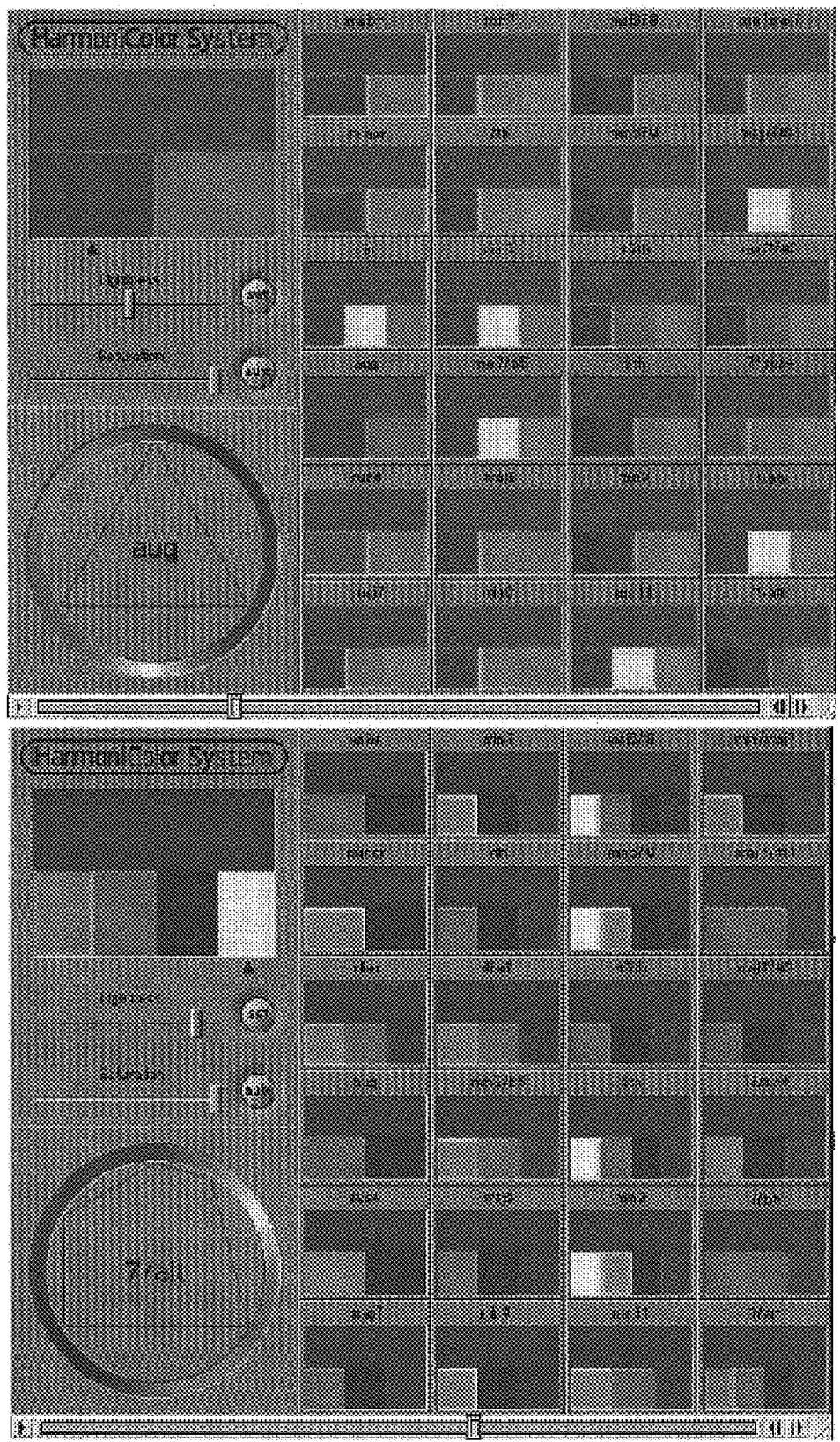
FIG. 10 shows a state displayed on a monitor of a computer for explaining another example of a method for selecting the harmony color according to the present invention FIG. 11 show a block diagram of a sound/color converting apparatus according to one preferred embodiment of the present invention.

FIG. 10 shows a state displayed on a monitor of a computer for explaining another example of a method for selecting the harmony color according to the present invention. FIG. 10 shows each harmony selection display according to the harmonics codes 'AUG' and '7/ALT'. Each harmony color selection display is displayed on a left with a harmony display window of the harmonics code, a luminance selection bar, a saturation selection bar, and a hue circle, and is displayed on a right with harmony colors of the harmonics codes prepared in a table. If the user selects a reference color on the hue circle in the right, the colors on the harmony color display window are changed.

Figure 11:
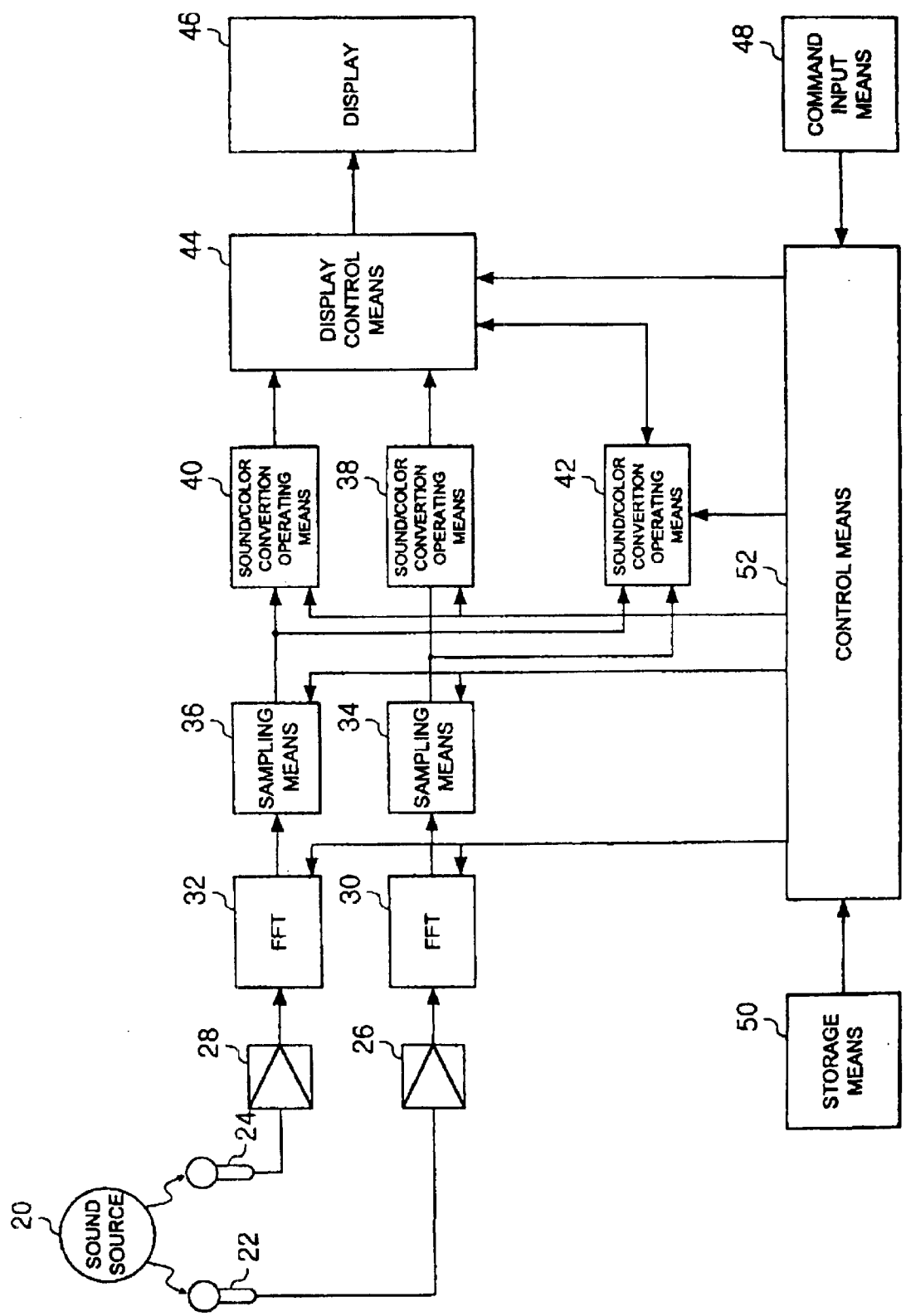

FIG. 11 show a block diagram of a sound/color converting apparatus according to one preferred embodiment of the present invention. The apparatus comprises microphones 22 and 24, amplifiers 26 and 28, Fourier transformers 30 and 32, sampling means 34 and 36, sound/color converting operation means 38 and 40, a sound source position operation means 42, display control means 44, a display unit 46, command input means 48, storage means 50, and control means 52.

The sound/color converting apparatus of FIG. 11 inputs sounds of 2 channels L and R through the microphones 22 and 24 for inputting the sound from the sound source 20. The inputted sound signals of the channels L and R are amplified through the amplifiers 26 and 28, the amplified signals are transformed through a fast Fourier function in a unit of every frame at the Fourier transformers 30 and 32, respectively. The Fourier-transformed signal is filtered by a desired filtering algorithm at the sampling means 34 and 36, and peak values of the filtered signal are classified in order of sound pressure, so that a desired number of peak values, for example, up to 30, are sampled. The peak values of the sampled signals have a value of frequency and a value of sound pressure, respectively. Each signal is transformed into a visible frequency by the function of the sound/color conversion at the sound/color converting operation means 38 and 40.

For example, the inputted audible frequency fi is 329.6 Hz corresponding to 'mi' tone of 4 octave, and a constant C' indicates 0.29 by the reference frequency corresponding to red. If the minimum audible frequency f1 and the minimum visible frequency F1 are set to 20 Hz and 350 Thz, respectively, the visible frequency to be derived from the above equation is 441 Thz, and the luminance of the color to be obtained is 4.33 (43.3%) relative to an operated value x.

The peak values of the sampled signal are provided to sound source operation means 42. The sound source operation means 42 operates the sound source positioned of two signals of the channels L and R at the same frequency.

Figure 12:
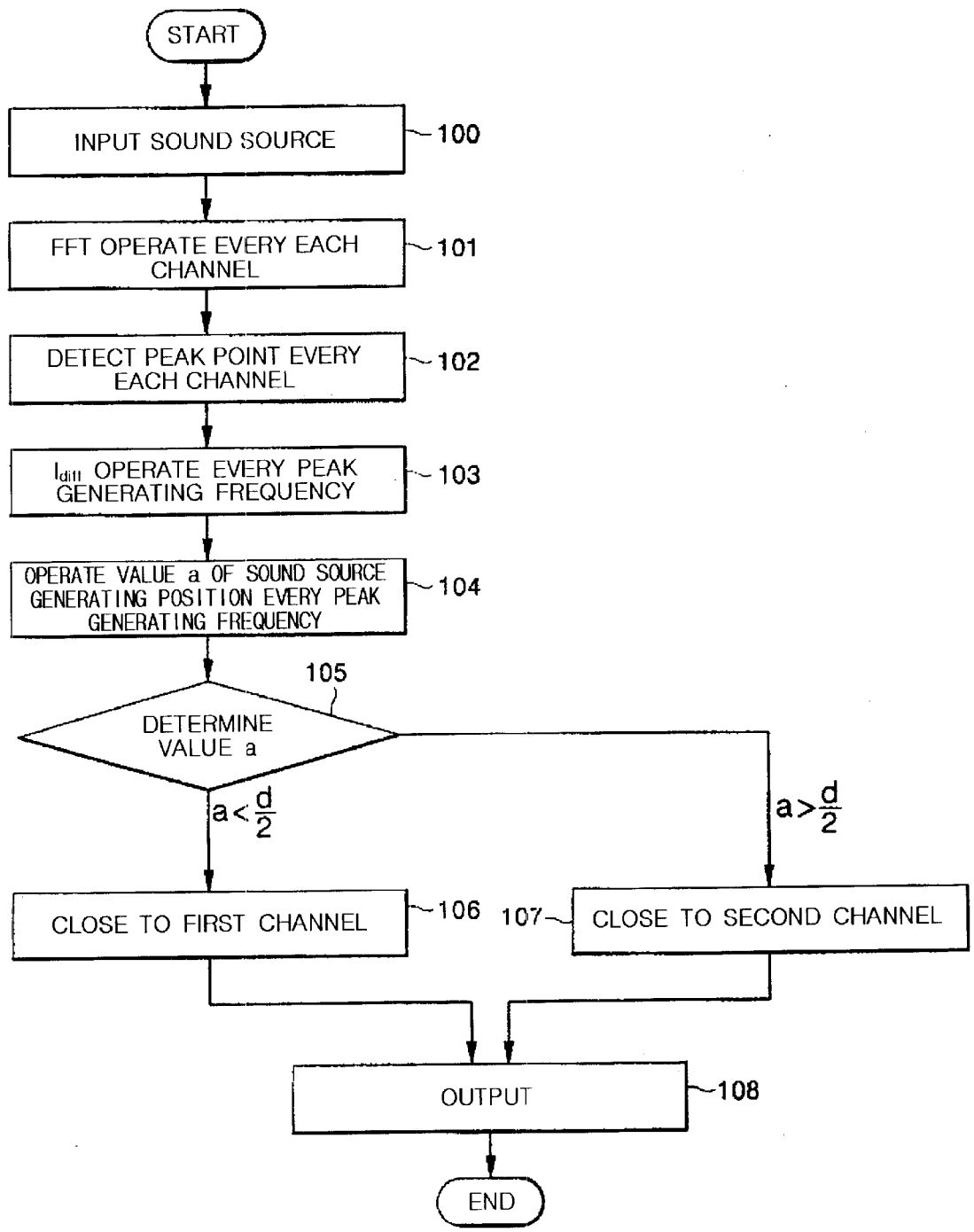
FIG. 12 is a flow chart explaining the detailed process of operating the sound source generation position according to a first embodiment of present invention.

FIG. 12 is a flow chart explaining the process of operating the sound source generation position according to a first embodiment of present invention.

Figure 13:
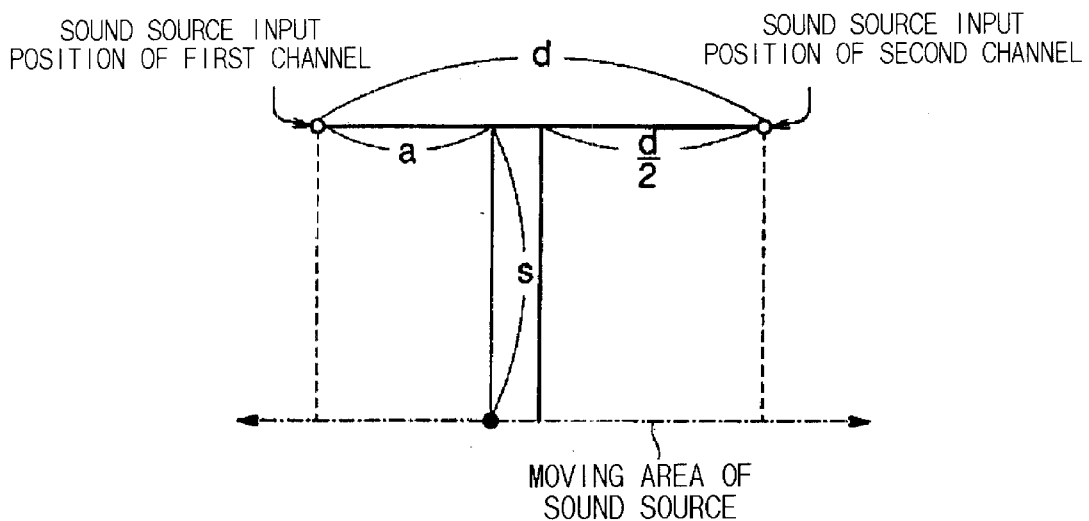
FIG. 13 is a perspective view of the sound source input position of each channel and the position of the sound source based on the first embodiment.

As shown in FIG. 13, supposing that the actual sound source is known, and the area to which the sound source moves is defined between the first and the second channels, the process in FIG. 12 operates the position generating the sound source between two channels, i.e., the sound source input position of the first channel and the sound source input position of the second channel, among a number of channels.

In the figure, a reference numeral d denotes a distance from the sound source input position of the first channel to the sound source input position of the second channel, s denotes a distance extending at right angle from a straight line extending between the sound source input positions of two channels to the actual sound source, and a denotes a value of the sound source generating position to be obtained with the sound input position of a particular channel (for example, the first channel) being set to zero.

The process for operating the value a of the sound source generating position comprises the steps of receiving the signal of the sound source every channel (step 100), operating the audible frequency inputted through each channel at a desired frequency interval in such a way of fast Fourier transform (referred to as FFT) based on the control signal and the sound source signal every channel (step 101), and detecting one or more peak points every channel based on the results of the FFT operation (step 102).

Figure 14:
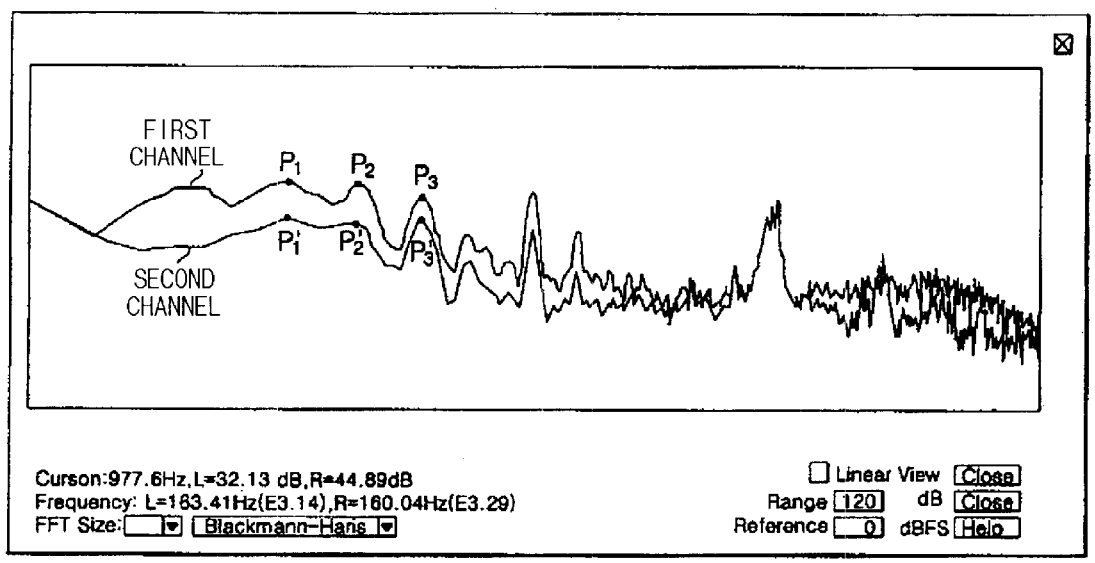
FIG. 14 is a frequency spectrum showing the results of FFT of the audible frequency every channel at one frame.

Specifically, FIG. 14 is a frequency spectrum showing the results of FFT operation of the audible frequency every channel at one frame. The horizontal axis and the vertical axis indicate a frequency axis and a sound pressure level axis, respectively. The figure shows the analysis results of the electrical signal of inputted sound in a dimension of sound pressure by frequency. Based on the FFT operation results, regarding to the same frequency, it detects a number of peak points consisting of the first peak point (P1), the second peak point (P2), and the third peak point (P3), at the first channel, and it detects a number of peak points consisting of the first peak point (P1'), the second peak point (P2'), and the third peak point (P3'), at the second channel.

It detects an interested frequency at each peak point detected by a channel, and detects a value of sound pressure level conversed in a dB scale degree, and operates the sound pressure differences every an interested frequency to output Idiff (step 103). In order words, in case of comparing the first peak point at the first and second channels, the Idiff means a result of a value of the sound pressure level of P1 minus a value of the sound pressure level of P1', and operates the generation position a of the sound source every the peak generation frequency based on the following equation according to the output Idiff and predetermined values s and d.

$$I_{diff} = k\left(\frac{1}{s^2 + a^2} - \frac{1}{s^2 + (d-a)^2}\right)$$

wherein, a is a value of sound source generating position to be obtained by setting the sound source input position of the first channel to zero, k is a constant of k>0, d is a distance from the sound source input position of the first channel to the sound source input position of the second channel, and s is a distance extending at right angle from a straight line extending between the sound source input positions of two channels to the actual sound source.

By reference to the equation, it operates the sound source generating position a every each peak generating frequency (step 104), and in case of a <d/2, determining in that the sound source generating position is adjacent to the first channel (step 106), while in case of a >d/2, determining in that the sound source generating position is adjacent to the second channel (step 107). It outputs the frequency value and the sound pressure level of each detected peak point, and the value of operated sound source generating position (step 108).

Figure 15:
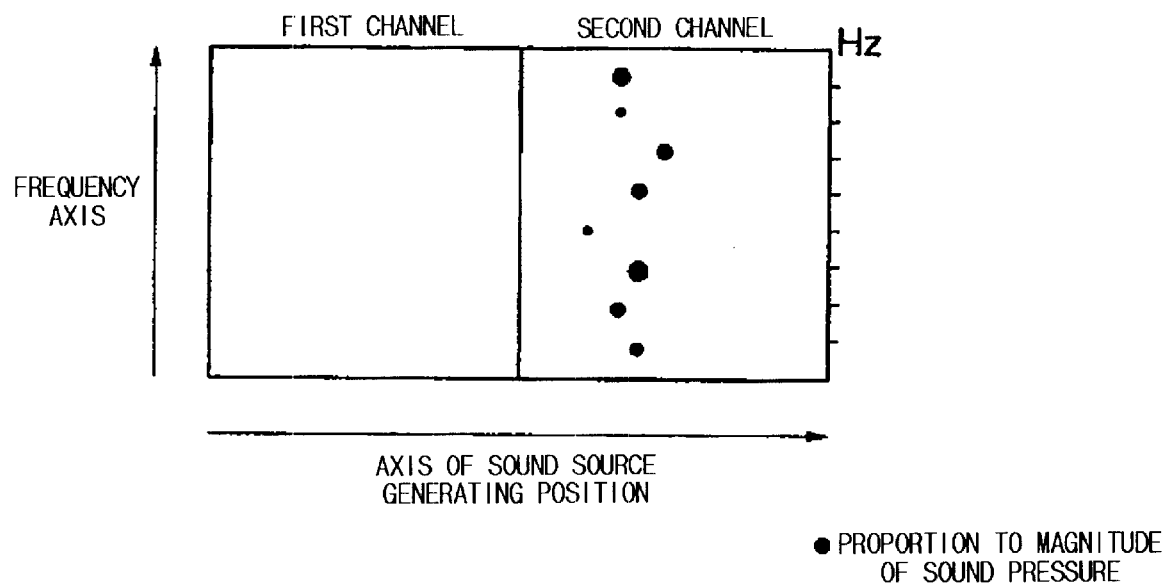
FIG. 15 is a perspective view illustrating one example of a display representing the sound in an image according to the first embodiment.

The display control means 44 outputs a visible ray based on the sound source generating position, and a frequency value and a sound pressure level of each peak point, and, as shown in FIG. 15, displays the color operated from the frequency of the sound source an area relative to the sound pressure by reference to the equation 3, with the sound source generating position being set to an axis of the first coordinates corresponding to the horizontal axis, and the frequency value of each sound source being set to an axis of the second coordinates corresponding to the vertical axis.

Accordingly, the display control means 44 displays easily the sound source generating position every peak generating frequency, the color corresponding to the sound source, and the magnitude of the sound pressure on two dimension of plane combining the first and the second axis.

Since the embodiment operates the sound source generating position every interested frequency with peak thereof detected, even though it analyzes the frequency inputted from the sound source generated at one point, the value of the sound source generating position every peak generating frequency in one frame is different to each other, while the second embodiment can derive the same value of sound source generating position in one frame.

Figure 16:
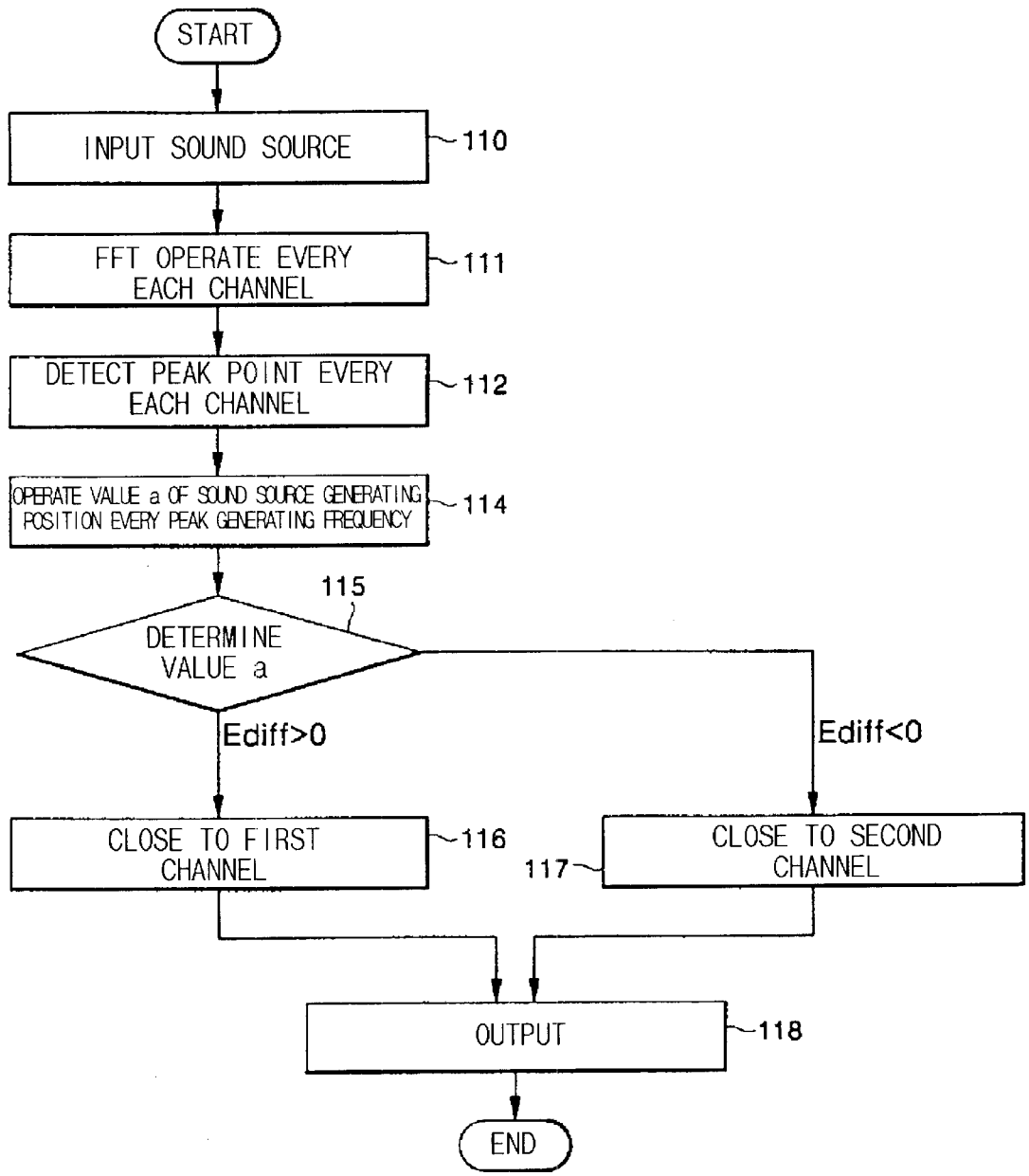
FIG. 16 is a flow chart for explaining the detailed process of the operation of the sound source generating position according to a second embodiment of the present invention.
Figure 17:
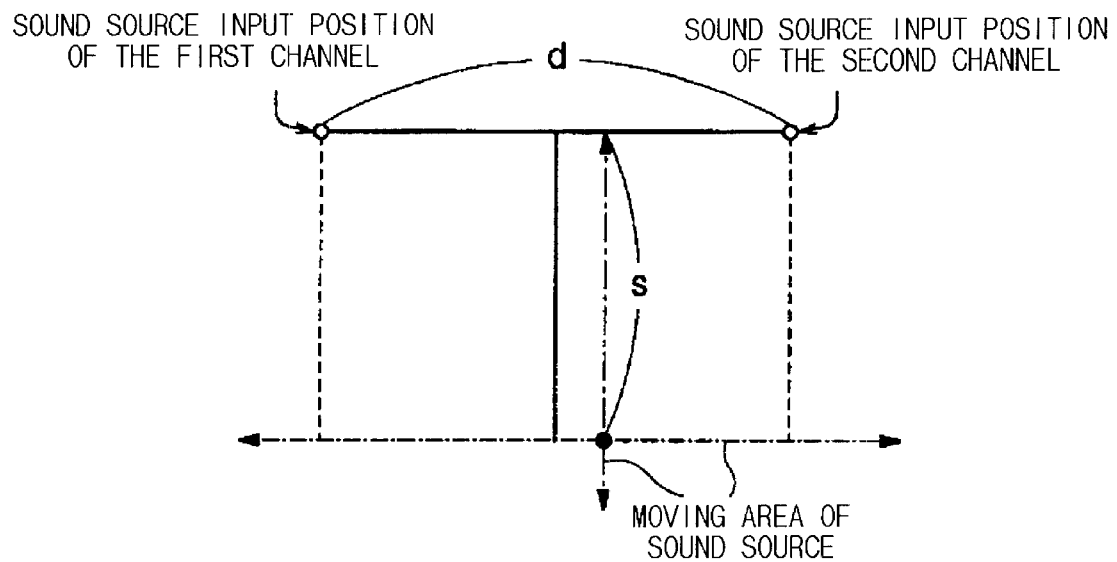
FIG. 17 is a perspective view illustrating the sound source input position and the position of the sound source of each channel based on the second embodiment.

FIG. 16 is a flow chart for explaining the process of the operation of the sound source generating position according to a second embodiment of the present invention.

As shown in FIG. 16, supposing the distance d between two channels, i.e., the sound source input position of the first channel and the sound source input position of the second channel, among a number of channels is unknown, the position of the actual sound source and the sound source moving area are not defined between the first and the second channels, and the sound source moves along the axis perpendicular to the axis connecting the first and the second channel, it detects the sound source generating position with the middle position between two channel being zero.

The process for operating the value a of the sound source generating position comprises the steps of receiving the signal of the sound source every channel (step 110), FFT operating the audible frequency inputted through each channel at a desired frequency interval (step 111), and detecting one or more peak points every channel based on the results of the FFT operation (step 112).

$E\text{diff}=M1\text{energy}-M2\text{energy}$ at that time, Energy=$\Sigma(P1^2+P2^2+\ldots Pn^2)$ wherein, Ediff is a value of the sound source generating position with the middle position between two channels being zero, Pn is a value of sound pressure level having a detected peak, n is a number of detected peak, M1energy is a value of sound pressure energy of the first channel, and M2energy is a value of sound pressure energy of the second channel.

By reference to the equation, it operates M1energy and M2energy according to the value of the sound pressure level every interested frequency having peak point detected at the first and the second channel, detects Ediff according to the results of M1energy–M2energy. It determines the Ediff is a positive number or a negative number (step 115), and in case of Ediff >0, determining in that the sound source generating position is adjacent to the first channel (step 116), while in case of Ediff <0, determining in that the sound source generating position is adjacent to the second channel (step 117). And then, the display control means 44 displays the frequency value and the sound pressure level of each detected peak point, and the value of operated sound source generating position (step 118).

Figure 18:
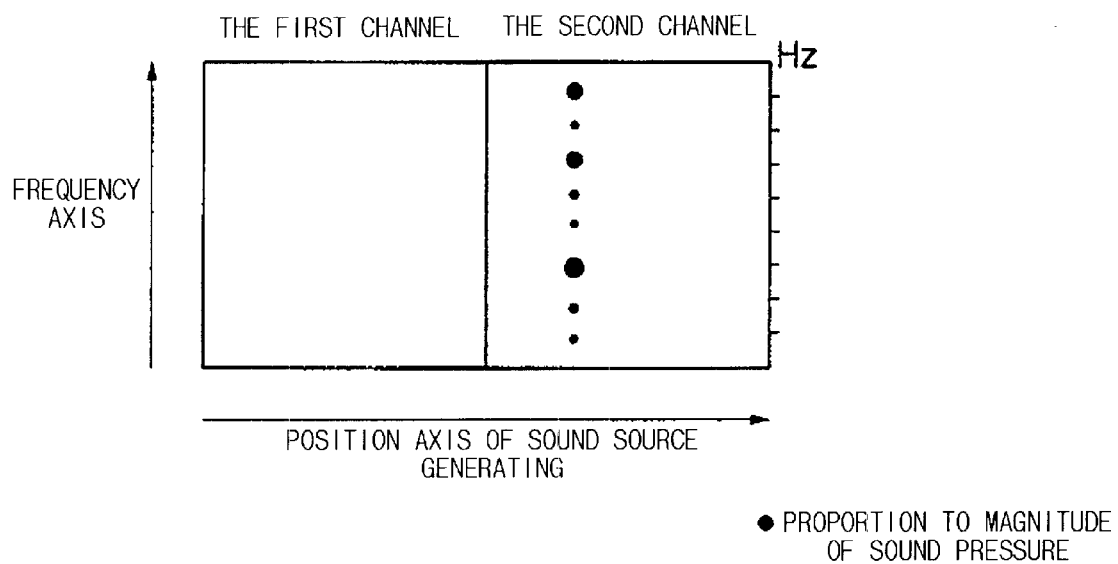
FIG. 18 is a perspective view illustrating one example of a display representing the sound in an image according to the second embodiment.

FIG. 18 shows one example of which the display means can display. The configuration of the display is identical to that of the first embodiment, and the sound source generating position every frequency displayed in a circle is arranged in a straight line paralleled with the second axis.

Figure 19:
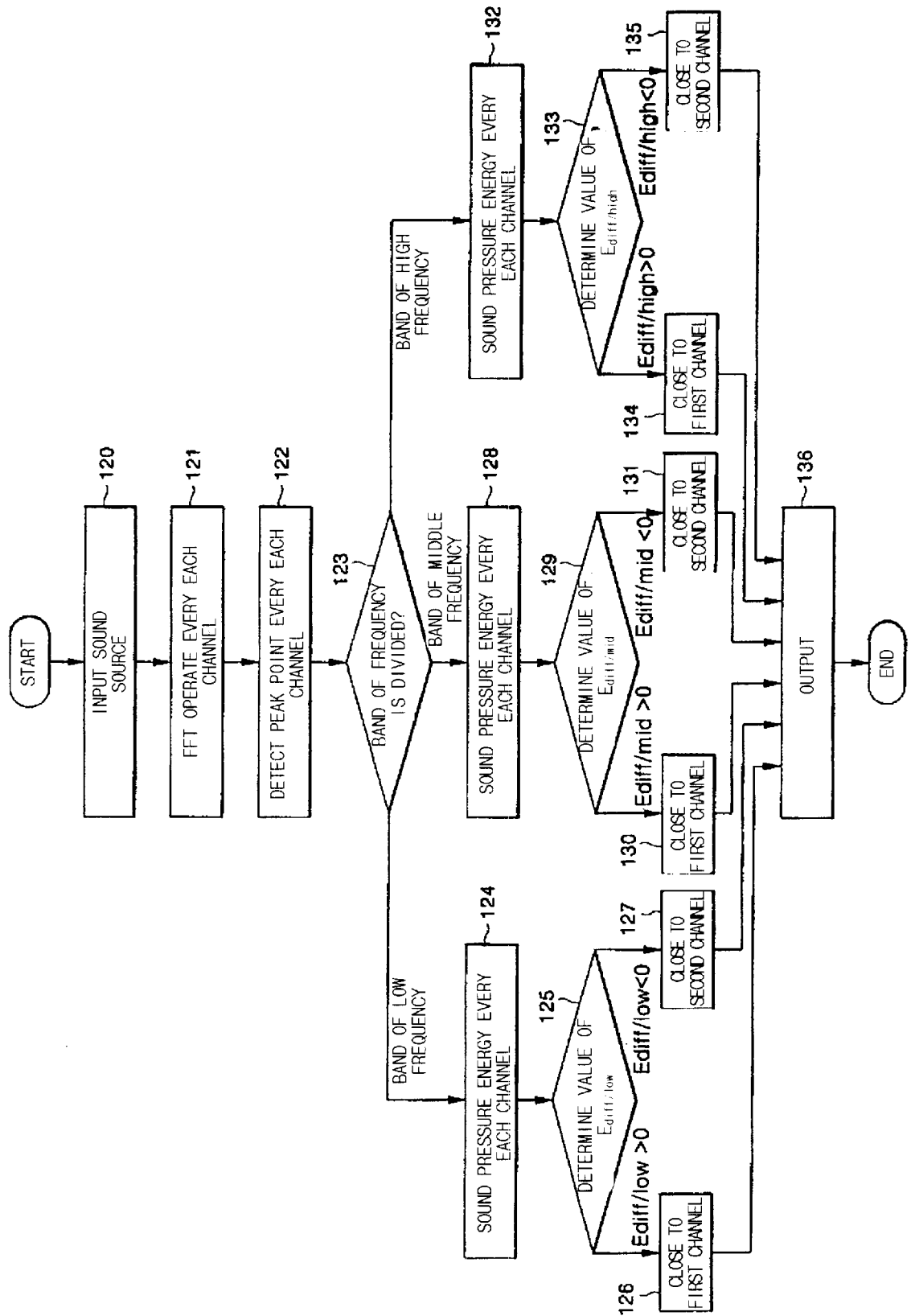
FIG. 19 is a flow chart for explaining the detailed process of the operation of the sound source generating position according to a third embodiment of the present invention.

FIG. 19 is a flow chart for explaining the process of the operation of the sound source generating position according to the third embodiment of the present invention. The embodiment is characterized by operating the sound source generating position every a band of frequency, in which the supposition on the actual position of the sound source and the sound source moving area is identical to that of the second embodiment, and the steps 120 to 122 in FIG. 19 are identical to those of the first embodiment.

The process for operating the value a of the sound source generating position comprises the steps of detecting one or more peak points every detected channel (step 122), and dividing the frequency every a band based on a desired frequency division reference (step 123). For example, in case of dividing the frequency into three areas, the audible frequency is divided into a band of low frequency (20 to 200 Hz), a band of middle frequency (200 to 2 kHz), and a band of high frequency (2 kHz to 20 kHz).

By reference to the equation, according to the value of the sound pressure level every a peak point detected at the band of low frequency, it operates the sound pressure energy M1energy/low of the first channel and the sound pressure energy M2energy/low of the second channel (step 124), respectively, operates Ediff based on the sound pressure energy detected at each channel (step 125), and determines whether the Ediff/low is a positive number or a negative number (step 125). In case of Ediff/low >0, it determines in that at the band of low frequency the sound source generating position is adjacent to the first channel (step 126), while in case of Ediff/low <0, determines in that the sound source generating position is adjacent to the second channel (step 127).

Based on the same principle, according to the value of sound pressure level of each peak point detected at bands of the middle and high frequency, it operates M1energy/mid and M2energy/mid, M1energy/high and M2energy/high, (steps 128 and 132), respectively, operates Ediff/mid and Ediff/high based on the sound pressure energy detected at each channel, and determines whether the Ediff/mid and the Ediff/high are a positive number or a negative number to determine the sound source generating position at the bands of the middle and high frequency (steps 129 to 131, and steps 132 to 135), respectively. And then, the display control means 44 displays the frequency value and the sound pressure level of each detected peak point, and the value of operated sound source generating position (step 136).

Figure 20:
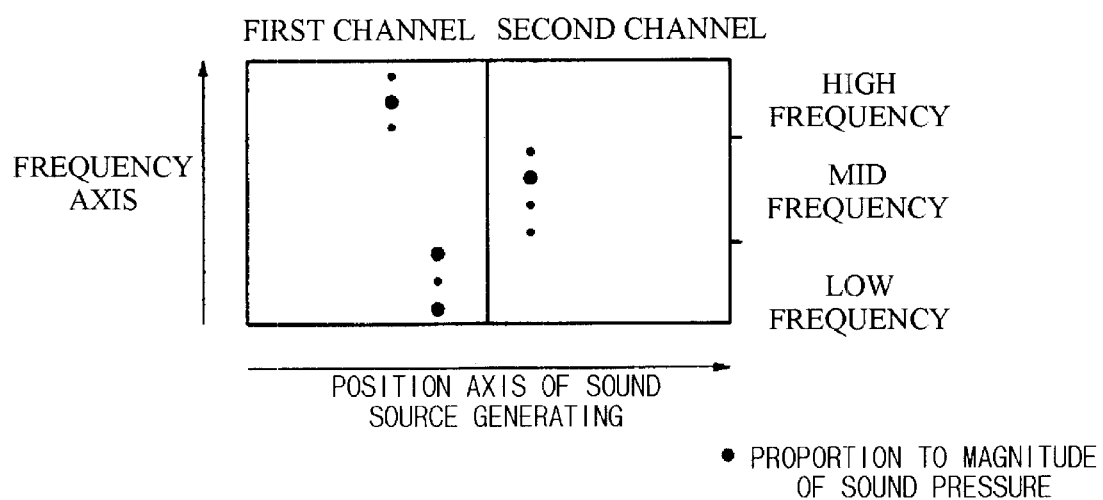
FIG. 20 shows one example of which the display means can display.

FIG. 20 shows one example of which the display means can display. The configuration of the display is identical to that of the above embodiments, and according to the operation of the sound source generating position every the band of frequency at one frame, the sound source generating position every frequency displayed in a circle is arranged in a straight line paralleled with the second axis.

In case of receiving a midi signal from a midi apparatus as an information of the sound without receiving from the sound source, since the midi signal has a position information of sound source having a channel different to each other, an information of musical instrument, and an information of scale degree, using a particular protocol, it is not necessary to operate the frequency of the sound source and the sound source generating position through the frequency analysis (FFT operation).

In case of receiving and reproducing the midi signal and visualizing it, since a particular harmonic tone constructing information (a particular interval, a particular magnitude, and an overtone generated in a particular number at a high frequency part centered on a main tone) corresponding to the musical instrument is stored in the storage means, the harmonic tone is reproduced according to the musical scale degree information so that an inherent sound of the musical instrument can be reproduced. Simultaneously, the information of the sound source generating position is displayed on the first axis, and the main sound (musical scale degree information) and the musical scale degree information of the harmonic tone (predetermined value according to the musical instrument information) are displayed on the second axis. The related magnitude and the color are displayed on the position.

Accordingly, in case of receiving the midi signal, since the information having different shapes every the channel (in order words, musical instrument) may be displayed, and since there is no the FFT operation, the cost is inexpensive, and the apparatus of the present invention can be applied to the conventional midi signal reproducing apparatus.

The display control means 44 can display the information of inputted peak as a visible ray having a surface area relative to the magnitude of the sound source generating position every a frequency, and a color corresponding to the frequency. In another embodiment of transforming the sound into the color and visualizing it, it uses the distributing state of coordinates as a keyframe of animation based on the frequency and the sound source generating position of each peak, and the motions of the animation can be displayed in response to the sound source generating position and the pitch of the tone by mapping the keyframe.

Specifically, by operating the sound source generating position of each peak, the display control means 44 receives two dimensional coordinate value, based on the frequency and the sound source generating position of each peak, as the keyframe information, and transforms the sound source generating position and the pitch of the tone into the motions of the animation (for example, a dancing doll) by mapping the keyframe information to display it. Thus, the display control means 44 displays the motions of the animation based on the information of the motions.

Figure 21:
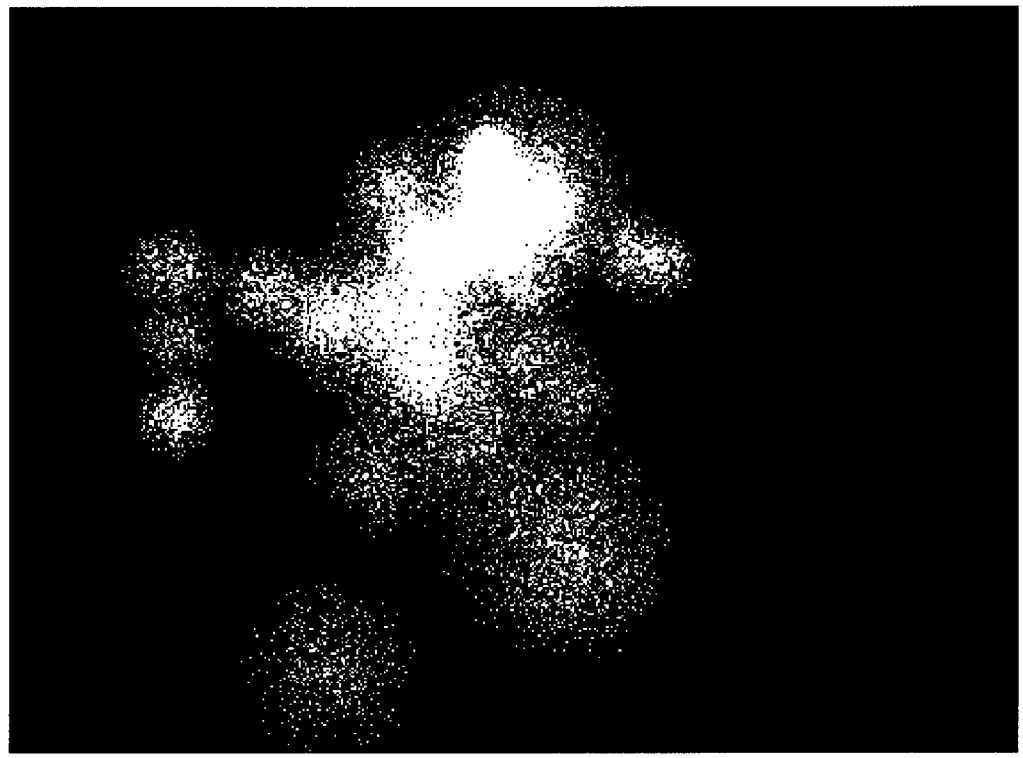
FIG. 21 is one example of a display according to the first embodiment of the present invention, and is a perspective view illustrating the distributing state of the sound source generating position to be used as an animation keyframe which is adapted to human body.
Figure 22:
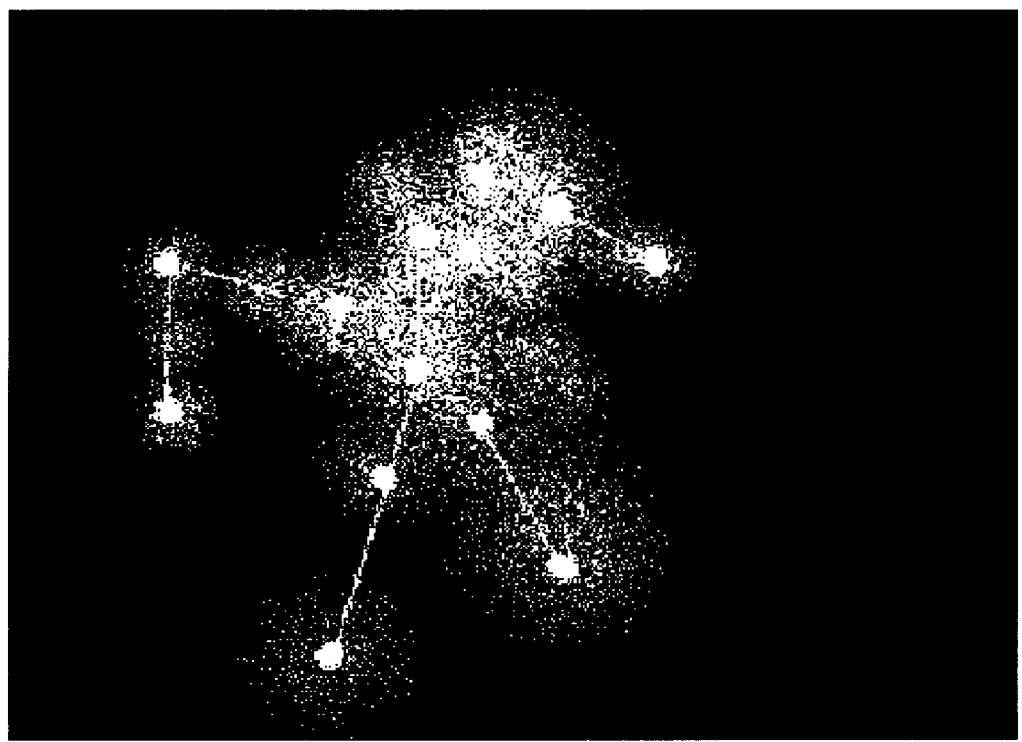
FIG. 22 is a perspective view illustrating the sound source to be adapted as a keyframe among the sound source distributed in FIG. 21.

FIG. 21 is one example of a display according to the first embodiment of the present invention, and is a perspective view illustrating the distributing state of the sound source generating position to be used as an animation keyframe which is adapted to human body. FIG. 22 is a perspective view illustrating the sound source to be adapted as a keyframe among the sound source distributed in FIG. 21.

Figure 23:
FIG. 23 is a perspective view illustrating the mapping process based on the keyframe information of FIG. 22.
Figure 24:
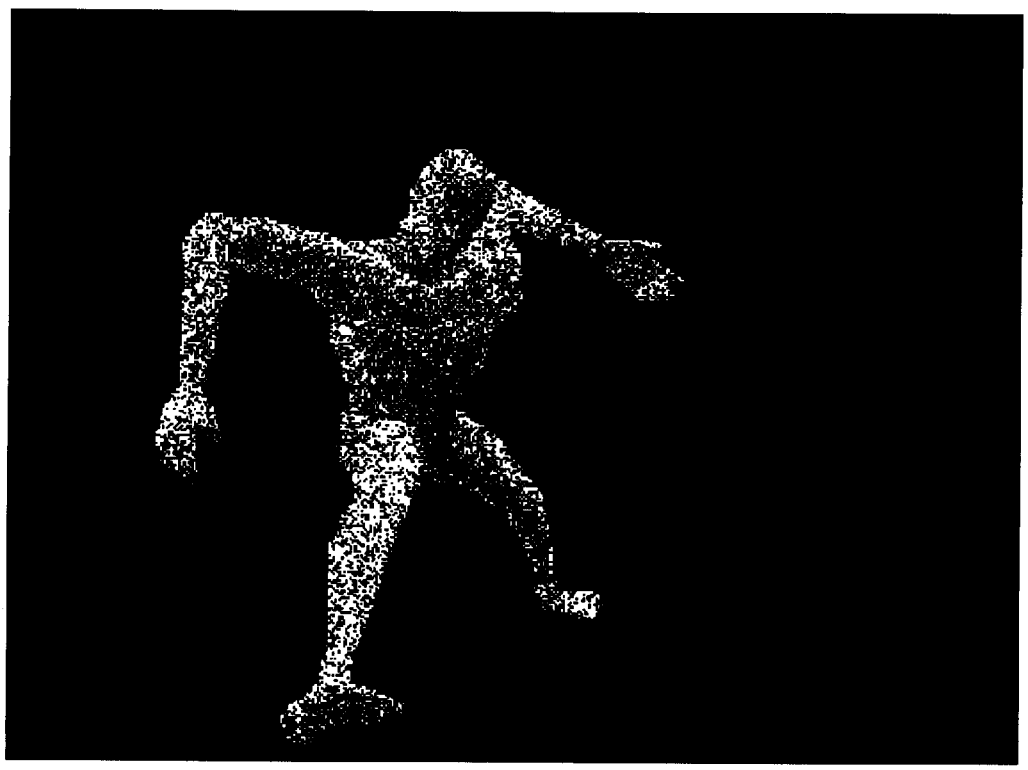
FIG. 24 is a perspective view illustrating the completed state of the mapping process of FIG. 23.

FIG. 23 is a perspective view illustrating the mapping process based on the keyframe information of FIG. 22, and FIG. 24 is a perspective view illustrating the completed state of the mapping process of FIG. 23.

As shown in the figures, the animation motions can be displayed by obtaining the portion similar to the human body as the animation keyframe data and mapping the human body and a particular shape.

Figure 25:
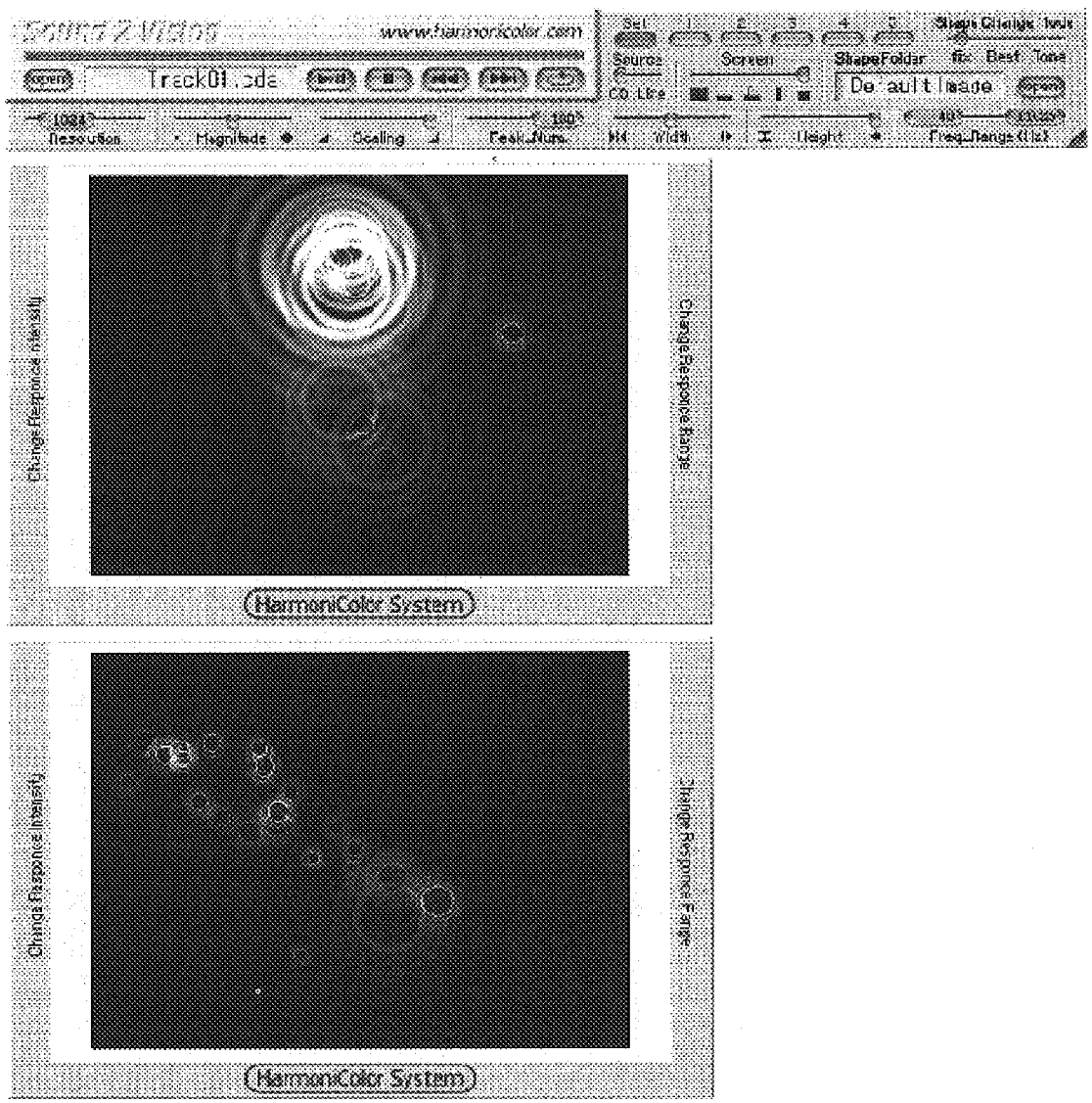
FIG. 25 shows one example of the command input means of sound/color converting mode of the present invention and a display state displaying the image of the sound.
Figure 26:
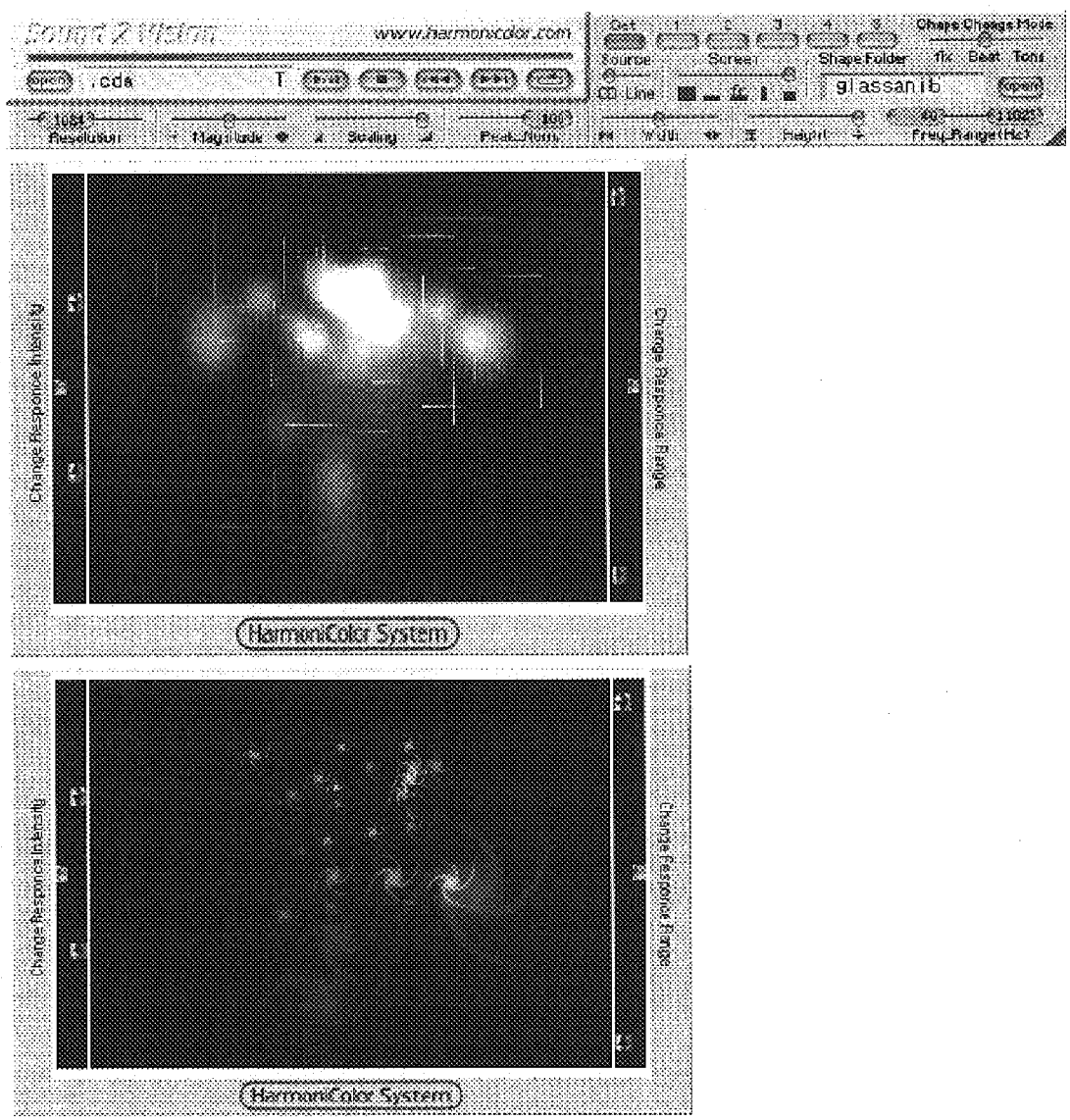
FIG. 26 shows a state displaying a sound in a bit mode.
Figure 27:
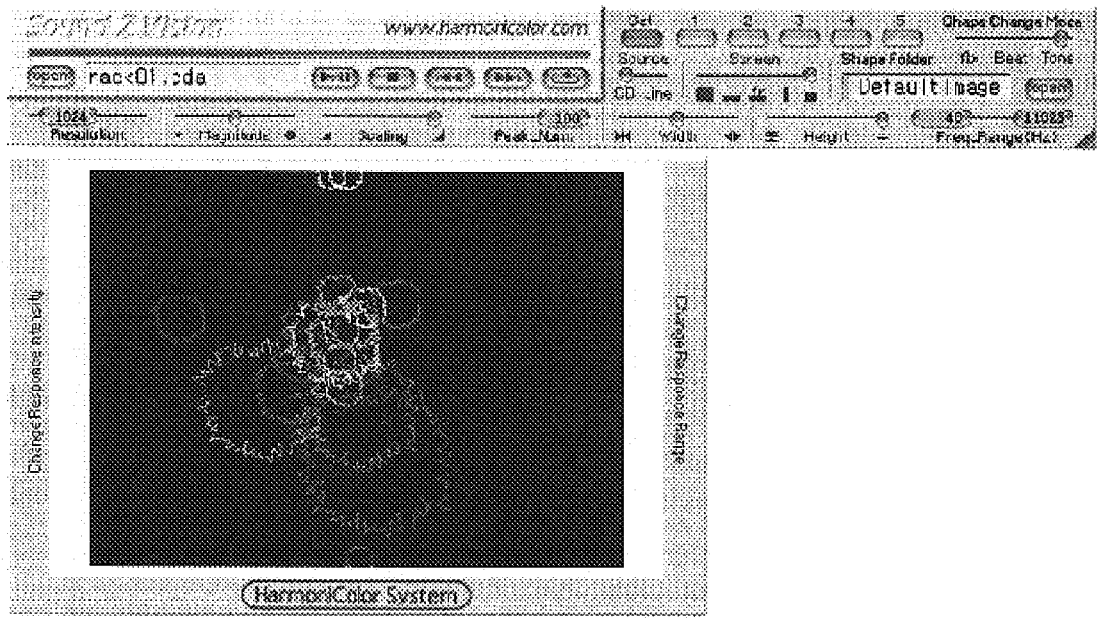
FIG. 27 shows a state displaying a sound in a tone mode.
Figure 28:
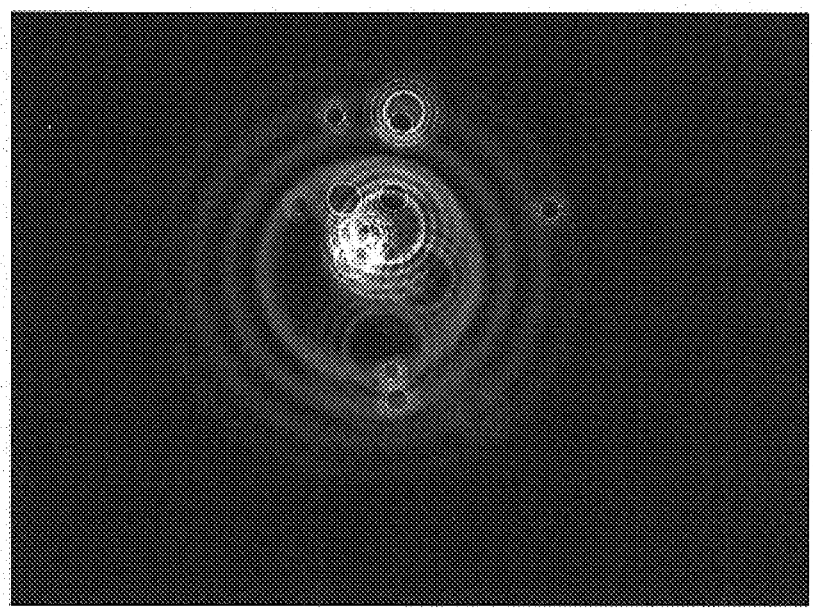
FIGS. 28 to 33 shows several examples of sound/color converting image by various image files.
Figure 29:
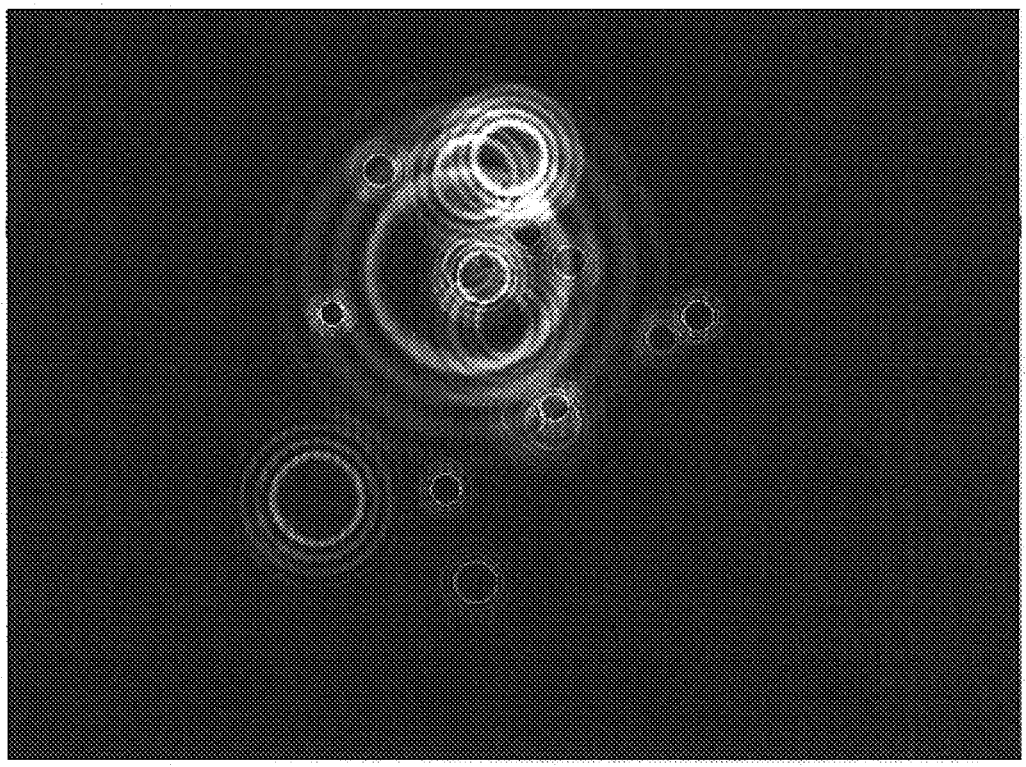
Figure 30:
Figure 31:
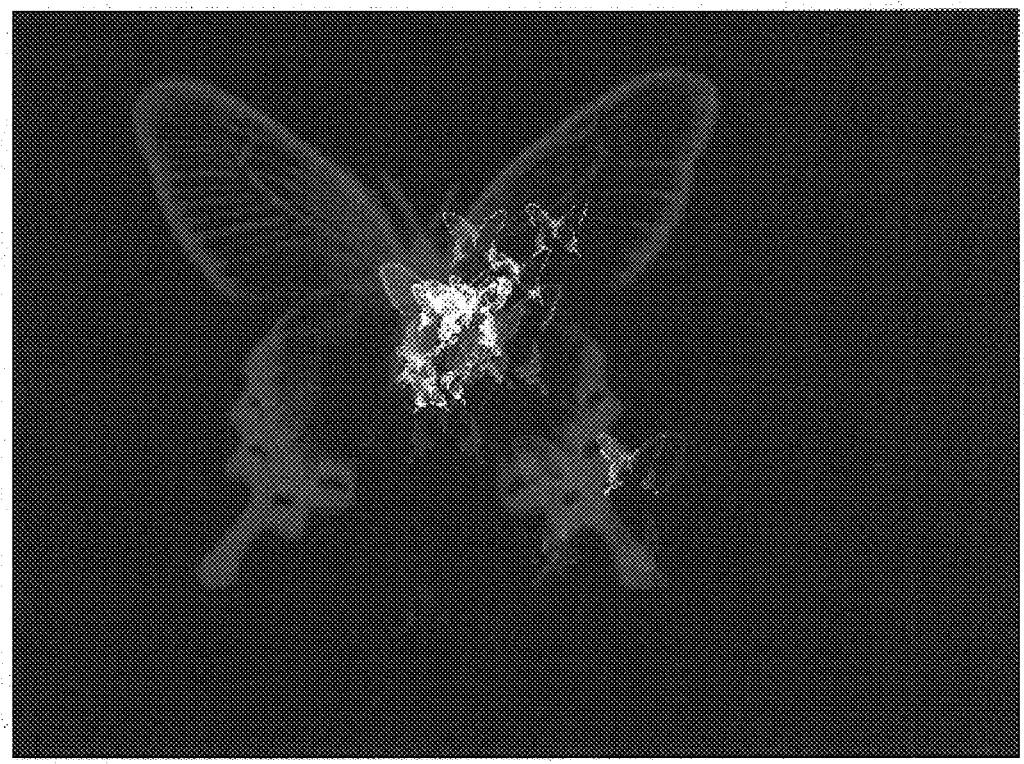
Figure 32:
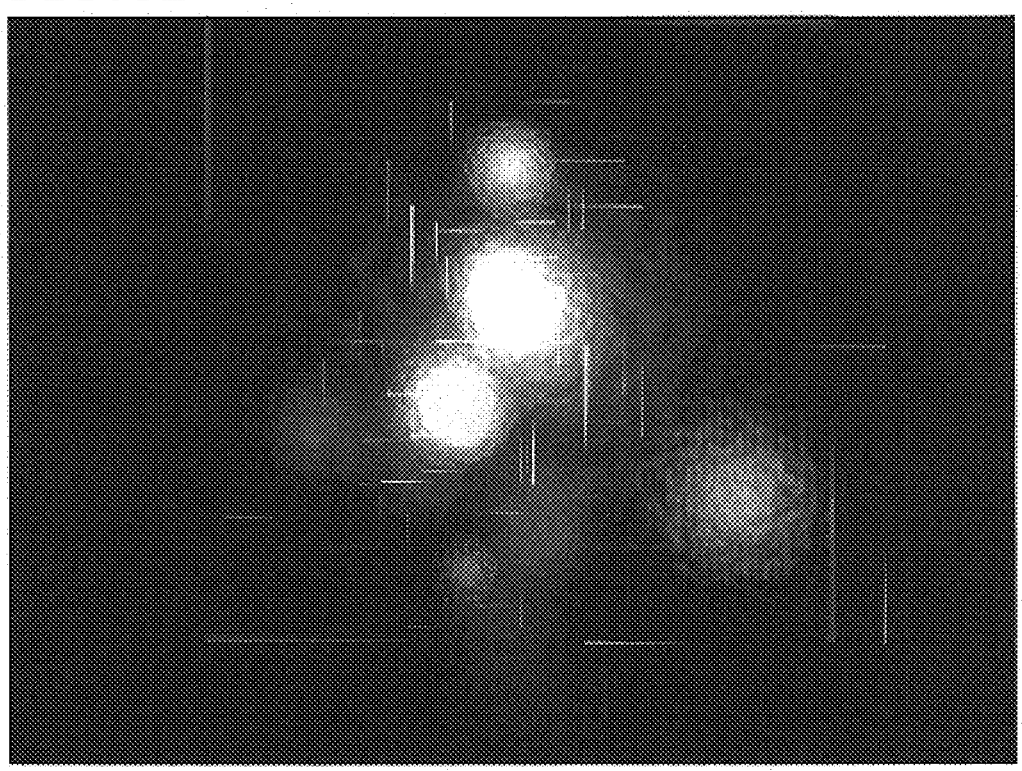
Figure 33:
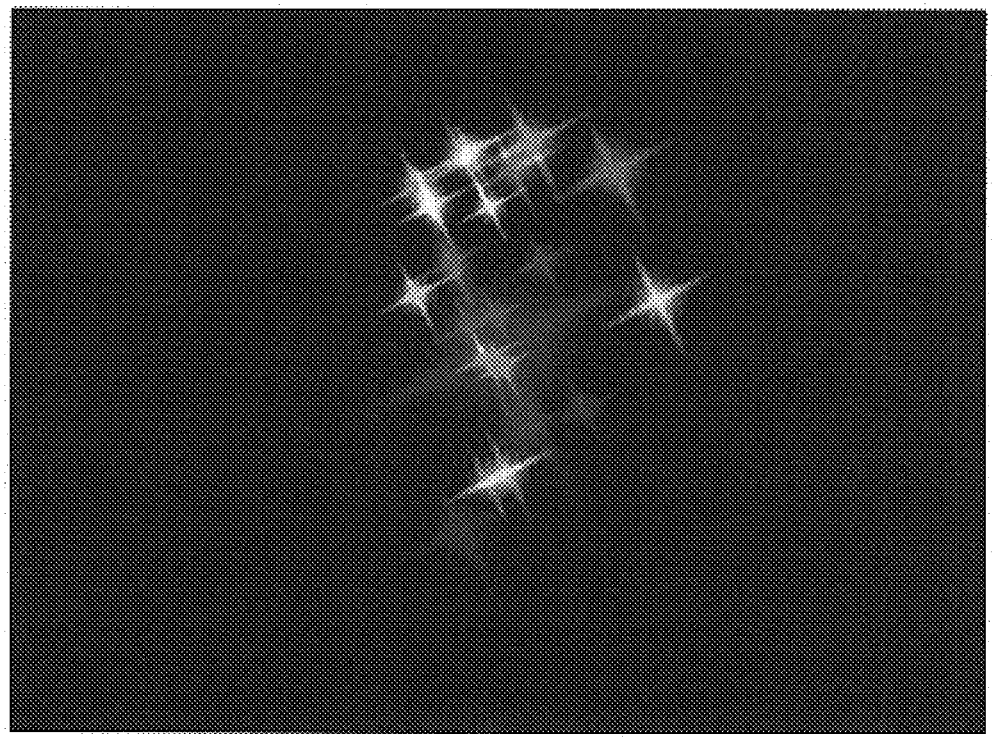

FIG. 25 shows one example of the command input means of sound/color converting mode of the present invention and a display state displaying the image of the sound. The sound/color converting input means shown if FIG. 25 is displayed on the display.

The sound/color converting command means comprises a music file open key, a music file list window, a reproducing key, a temporarily stop key, a stop key, a fast rewinding key, a fast reproducing key, a repeat key, a Fourier transform resolution adjusting key, a magnitude adjusting key, a scaling adjusting key, a peak value adjusting key, or the like, on a left.

The music file open key is used upon opening a music file from other directory.

The music file list window provides a list of opened music file.

The Fourier transform resolution adjusting key is to adjust a resolution of a vertical axis of the display, and adjusts the sampling resolution at each frame unit upon Fourier transforming.

The magnitude key adjusts a dimension of the sampled peak value.

The scaling adjusting key adjusts the dimension of the sampled peak value linearly or nonlinearly.

The peak value adjusting key adjusts the number of selected peak value among total sampled peak value every each frame.

The sound/color converting means comprises an image file open key, an image file list window, a screen mode selecting key, a sound input selecting key, a display width adjusting key, a display height adjusting key, a sound frequency band setting key, a display output mode selecting key, a setting value memory key, or the like, on a right.

The image file list window displays a list of the selected image file.

The screen mode selecting key provides a full screen, a reduction screen, a vertical screen, a horizontal screen, a horizontal frequency screen, or the like.

The sound input selecting key selects a CD mode in case of a music file on a hard of the computer or a line mode in case of inputting the actual sound through the microphone in real time.

The display width adjusting key concentrates the position of the sound source toward a center vertical axis by using a left portion, or spreads the position of the sound source opposite to the center vertical axis by using a right portion. In order to display exaggeratedly the stereo sense, the right end is adjusted.

The display height adjusting key concentrates the position of the frequency toward a center horizontal axis by using a left portion, or spreads the position of the frequency opposite to the center horizontal axis by using a right key.

The display output mode selecting key selects a fix mode, a bit mode, and a tone mode.

In the fix mode, as shown in FIG. 25, the selected one image file is displayed as an image.

In the bit mode, as shown in FIG, 26, the image file to be displayed is changed according to the condition. The changing condition of the image file is controlled by keys displayed on the left and right of the display. The right key is to set the band of frequency to be detected, and the left key is to set a thresh hold for detecting a magnitude of the image file in the set band of the frequency. Therefore, if an image having a size exceeding the thresh hold id displayed in corresponding to the high sound pressure in the set band, the next image is displayed.

In the tone mode, as shown in FIG, 27, the image is displayed in a shape of wave along a circumference according to time. According to the tone mode, the wave change according to the time of input sound will be seen.

FIGS. 28 to 33 shows several examples of sound/color converting image by various image files. Accordingly, the present invention can represent the sound in several images by various shapes of reference image file.

Figure 34:
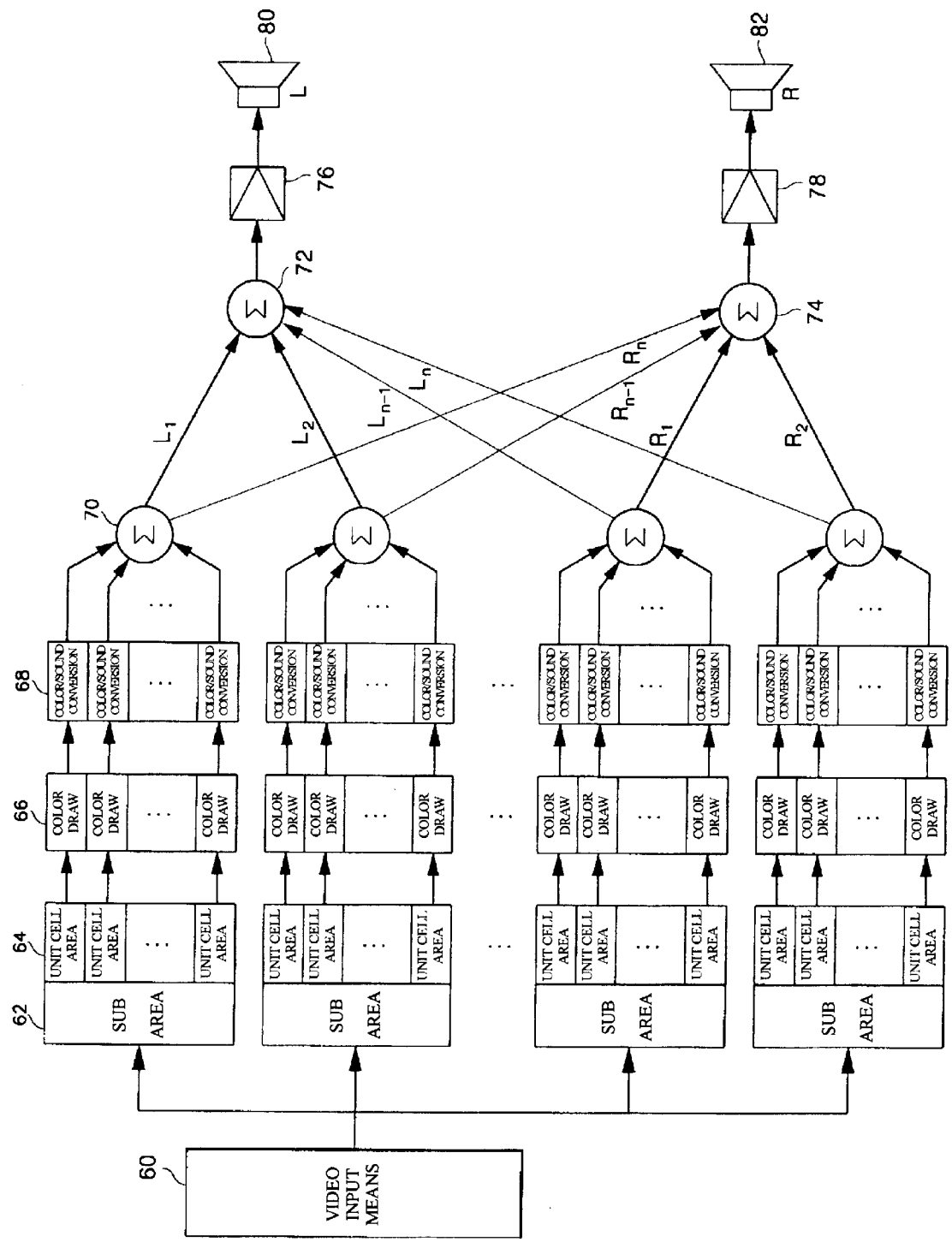
FIG. 34 a block diagram illustrating one example of color/sound converting apparatus according to the present invention.
Figure 35:
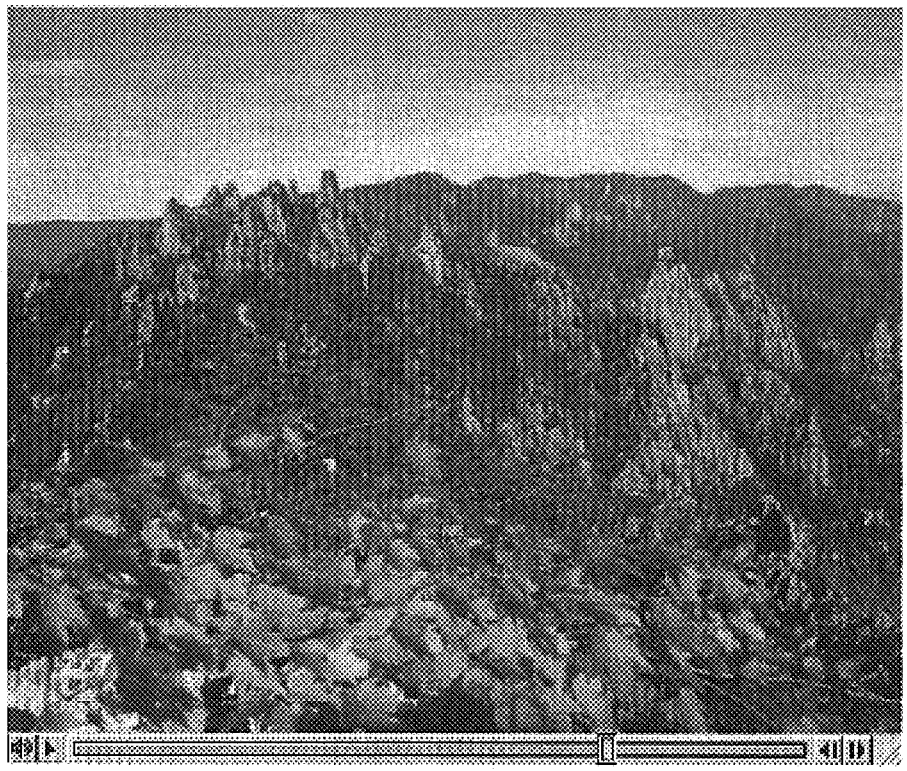
FIG. 35 is a circle image for a color/sound conversion.

FIG. 34 shows one example of color/sound converting apparatus according to the present invention, the color/sound converting apparatus comprising image input means 60, color extracting means 66, color/sound conversion operating means 68, sub-sound composing means 70, channel L composing means 72, channel R composing means 74, amplifiers 76 and 78, and loudspeakers 80 and 82.

The image input means 60 inputs motion image or stop image picked up by a video camera or a digital camera. The inputted image is provided to the image scanning means 62 and 64 in 30 frames every a second.

Figure 36:
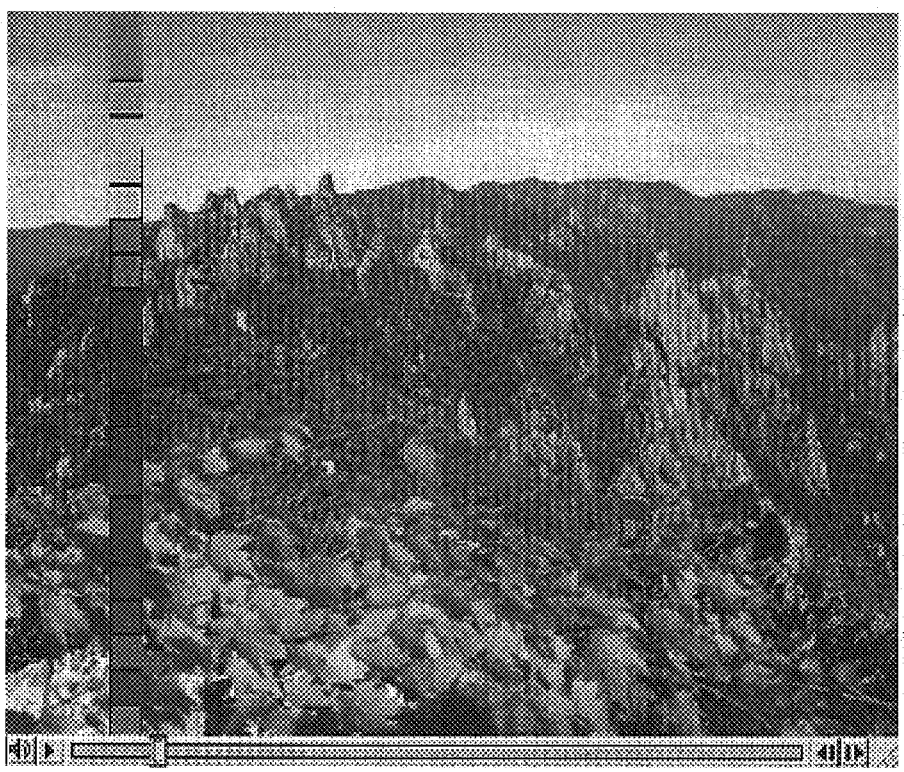
FIG. 36 shows a display state explaining a sub-area adapted to a circle image.
Figure 37:
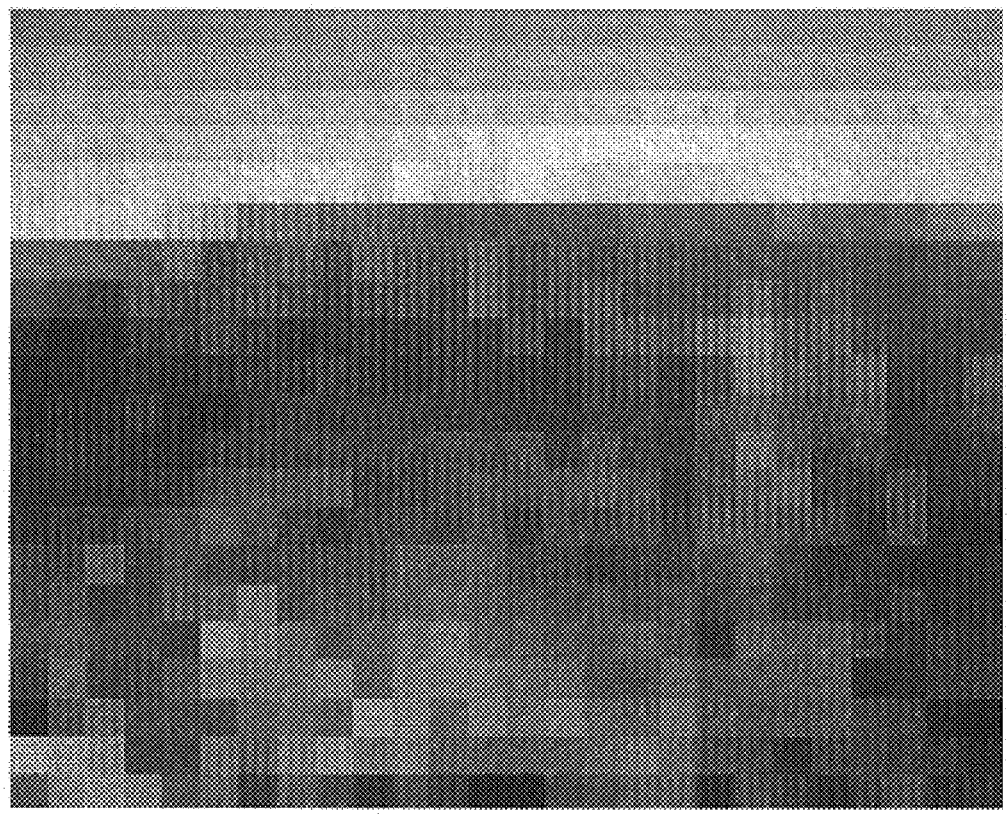
FIG. 37 shows a display state of adapting a number of sub-areas to the whole surface of a circle image.

The image scanning means 62 and 64 is consisting of a sub region 62 and a unit cell region 64. In the embodiment of the present invention, the sub region 62, as shown in FIG. 36, has a scanning bar with a number of unit cells arranged vertically. Each unit cell has several pixels of m×n size. The two dimensional image is divided into a number sub-areas, as shown in FIG. 37.

The color extracting means 66 extracts the color frequency and luminance of the unit cell in a representative value, for example, an average value, a middle value, and an highest value, of the pixel by inputting the number of pixel values from each unit cell 64.

The color/sound conversion operating means 68 generates a audible frequency based on the function of the color/sound conversion using the color frequency and the luminance provided form the color extracting means 68.

The sub-sound composing means 70 composites the audible frequencies corresponding to each unit cell to generate one composite signal, The number of composing means outputs a channel L composing sound Li and a channel R composing sound Ri corresponding to the position value of which each sub-area is arranged on a circle. For example, according to the sub-area arranged on the extremely left, if the value of position L is 10, the value of position R is zero, while according to the sub-area arranged on the extremely right, if the value of position is zero, the value of position R is 10.

The channel L composing means 72 composites composing sounds L1 to Ln of several channel L to produce a sound of the channel L, and the channel R composing means 74 composites composing sounds R1 to Rn of several channel R to produce a sound of the channel R.

The produced sounds of the channels L and R output through the amplifiers 76 and 78 to the loudspeakers 80 and 82.

The color of image outputs in a stereo sound in each frame unit.

In case of outputting the image in a mono sound, the sound of each sub-area can be outputted by scanning the sub-area from left to right in response to the scanning speed.

Although the present invention has been described with reference to the drawings, it is understood that this description is not to limit the invention to the embodiments shown in the drawings but simply to explain the invention. One skilled in the art will understand that various changes and modifications can be made from the embodiments disclosed in the specification. Therefore, the scope of the present invention should be defined by the appended claims.

What is claimed is:

1. A method of selecting a harmony color using harmonics, the method comprising the steps of:

selecting a scale degree dividing rate and a harmonics code;

selecting a reference color from a sound/color converting table;

operating a luminance of the selected reference color;

determining an octave corresponding to the luminance; and operating a frequency of the harmonic color from the referenced frequency by reference to a harmony frequency ratio of the selected harmonics code according to the following eguation:

$$F_h = F_r \times (\sqrt[k]{2})^n$$

wherein $F_h$ denotes a harmony freguency to be obtained, $F_r$ denotes an input freguency, k denotes the number of musical scale degree which is resulted from dividing a freguency of one octave by a constant rate, n denotes a harmony freguency ratio and $1 \leq n \leq (k-1)$, in which k and n are natural numbers in response to a scale degree frequency ratio in the determined octave.

2. The method claimed in claim 1, further comprising the steps of:

(v) converting the harmonic frequency into the band of visible frequency when the operated harmonic color is deviated from a band of visible frequency in step (vi); and (vi) displaying the operated frequency of the harmonic color as a harmonic color of the reference color.

3. An apparatus of selecting a harmony color, the apparatus comprising:

means for selecting scale degree dividing rate, a harmonics code, and a reference color;

means for storing a table of the harmony frequency ratio of the harmony scale degree by the harmonics code according to the musical scale degree dividing rate;

means for operating a luminance of the selected reference color, determining an octave corresponding to the luminance, and operating a frequency of the harmonic color from the referenced frequency by reference to a harmony frequency ratio of the selected harmonics code in the table according to the following eguation:

$$F_h = F_r \times (\sqrt[k]{2})^n$$

wherein, $F_h$ denotes a harmony freguency to be obtained, $F_r$ denotes an input freguency, k denotes the number of musical scale degree which is resulted from dividing a freguency of one octave by a constant rate, n denotes a harmony freguency ratio and $1 \leq n \leq (k-1)$, in which k and n are natural numbers.

4. The apparatus claimed in claim 3, wherein 12 musical scale degrees and 12 color system are arranged on the first coordinate axis in a relationship of 1:1 by setting 'do' of scale degree and 'red' of a color system to an original point of the coordinates, and 10 octaves and 10 luminance are arranged on the second coordinate axis in relationship of 1:1.

5. The apparatus as claimed in claim 4, wherein the sound/color converting table is any one of circular coordinate system and orthogonal coordinate system.

6. The apparatus as claimed in claim 4, wherein a 'red' of the color system has a wavelength of which 'do, mi, sol' of the scale degree is approximate to 'red, green, blue' of the color system.

7. The apparatus as claimed in claim 6, wherein a wavelength of the red of the color system is 682 nm.

8. The apparatus as claimed in claim 5, wherein the circular coordinate system is set that the first coordinate axis is in a direction of circumference, and the second coordinate axis is in a direction of a center of circle.

9. The apparatus as claimed in claim 5, wherein the orthogonal coordinate system is made in such a way that a saturation is in direct proportion to the scale degree.

10. The apparatus as claimed in claim 5, wherein the orthogonal coordinate system is made in such a way that the luminance is in direct proportion to the scale degree.

11. The apparatus as claimed in claim 4, wherein a musical instrument which corresponds to musical scale degree position being colored by a sound/color converting table.

12. The apparatus as claimed in claim 11, wherein the sound/color converting table is made in such a way that a saturation is in direct proportion to the musical scale degree.

13. The apparatus as claimed in claim 11, wherein the sound/color converting table is made in such a way that the luminance is in direct proportion to the musical scale degree.

14. The apparatus claimed in claim 3, further comprising:
means for converting the frequency of the harmonic color into the band of visible frequency when the operated harmonic color is deviated from a band of visible frequency; and
means of displaying the operated frequency of the harmonic color as a harmonic color of the reference color.

15. A method of converting a sound to a color, the method comprising the steps of:
Fourier-transforming an inputted sound;
sampling at least one signal of particular audible frequency among the Fourier-transformed signals;
converting at least one sampled signal of the audible frequency into a signal of a visible frequency using following equation; and
displaying a color corresponding to at least one converted visible frequency:

$$F = F_I \times 2^{x^*}$$

$$B_F \propto x$$

wherein, $$x = \log_2\left(\frac{f_i}{f_I}\right) + C',$$

F is a visible frequency to be obtained, $F_I$ is a reference visible frequency, a positive number of x is a value of octave, $B_F$ is a luminance of color, x* is places of decimals and denotes a height of sound in one octave, $f_i$ is a sampled audible frequency, $f_I$ is a reference audible frequency, C' is a constant and denotes a rear number between $0 \leq C' \leq 1$.

16. The method as claimed in claim 15, wherein the sampling step includes the steps of inputting the Fourier-transformed signal every a constant time interval in a frame unit; obtaining one or more peak values every a frame; classifying the obtained peak values in order of sound pressure dimension; and sampling the desired number of peak values in order of sound pressure dimension.

17. The method as claimed in claim 16, wherein the displaying step displays an image colored with the converted color and having a dimension in proportion to a sound pressure of each peak value at a frequency position of each sampled peak value.

18. The method as claimed in claim 16, wherein the displaying step displays an image colored with the converted color and having motions of animation in proportion to a sound pressure of each peak value at each position of the animation corresponding to a frequency position of each sampled peak value.

19. The method as claimed in claim 16, wherein the displaying step overlaps and displays each image having a dimension in proportion to a sound pressure of every peak value at a desired position.

20. A method of converting a sound to a color, the method comprising the steps of:
Fourier-transforming a number of inputted sounds through a number of channels;
sampling at least one signal of particular audible frequency among the Fourier-transformed signals;
operating a sound source position between a number of channels using the signals of audible frequency corresponding to each other;
converting at least one sampled signal of the audible frequency among a number of sounds into a signal of a visible frequency using following equation; and
displaying a color corresponding to at least one converted visible frequency according to a frequency and sound position:

$$F = F_I \times 2^{x^*}$$

$$B_F \propto x$$

wherein, $$x = \log_2\left(\frac{f_i}{f_I}\right) + C',$$

F is a visible frequency to be obtained, $F_I$ is a reference visible frequency, a positive number of x is a value of octave, $B_F$ is a luminance of color, x* is places of decimals and denotes a height of sound in one octave, $f_i$ is a sampled audible frequency, $f_I$ is a reference audible frequency, C' is a constant and denotes a rear number between $0 \leq C' \leq 1$.

21. The method as claimed in claim 20, wherein the sound source generating position between the sound source input position of a number of channels is operated as following equation:

$$I_{diff} = k\left(\frac{1}{s^2 + a^2} - \frac{1}{s^2 + (d-a)^2}\right)$$

wherein, a is a value of sound source generating position to be obtained by setting the sound source input position of the first channel to zero, d is a distance from the sound source input position of the first channel to the sound source input position of the second channel, s is a distance extending at right angle from a straight line extending between the sound source input positions of two channels to the actual sound source, k is a constant of k>0, and $I_{diff}$ is a sound pressure value of the first channel minus the sound pressure value of the second channel at a particular peak.

22. An apparatus of converting a sound into a color, the apparatus comprising:
   means for inputting the sound;
   means for amplifying the input sound;
   means for Fourier-transforming the amplified sound;
   means for sampling at least one signal of particular audible frequency among the Fourier-transformed signals;
   means for converting at least one sampled signal of the audible frequency into a signal of a visible frequency according to the following equation:

$$F = F_l \times 2^{x^*}$$

$$B_F \propto x$$

wherein, $$x = \log_2\left(\frac{f_i}{f_l}\right) + C',$$

F is a visible frequency to be obtained, $F_l$ is a reference visible frequency, a positive number of x is a value of octave, $B_F$ is a luminance of color, x* is places of decimals and denotes a height of sound in one octave, $f_i$ is a sampled audible frequency, $f_l$ is a reference audible frequency, C' is a constant and denotes a rear number between $0 \leq C' \leq 1$; and
   means for displaying a color corresponding to at least one converted visible frequency.

23. An apparatus of converting a sound into a color, the apparatus comprising:
   means for Fourier-transforming a number of inputted sounds through a number of channels;
   means for amplifying the input sound;
   means for Fourier-transforming the amplified sound;
   means for sampling at least one signal of particular audible frequency among the Fourier-transformed signals;
   means for operating a sound source position between a number of channels using the signals of audible frequency corresponding to each other;
   means for converting at least one sampled signal of the audible frequency into a signal of a visible frequency according to the following eguation:

$$F = F_l \times 2^{x^*}$$

$$B_F \propto x$$

wherein $$x = \log_2\left(\frac{f_i}{f_l}\right) + C',$$

F is a visible freguency to be obtained, $F_l$ is a reference visible freguency, a positive number of x is a value of octave, $B_F$ is a luminance of color, x* is places of decimals and denotes a height of sound in one octave, $f_i$ is a sampled audible frequency, $f_l$ is a reference audible freguency, C' is a constant and denotes a rear number between $0 \leq C' \leq 1$; and
   means displaying a color corresponding to at least one converted visible frequency according to a frequency and sound position.

24. The apparatus as claimed in claim 23, wherein the displaying means is any one of a display appliance such as CRT and LCD, a full color display lamp, an illumination unit such as a color laser light source apparatus.

25. A method of converting a color into a sound, the method comprising:
   obtaining a visible frequency $F_i$ and a luminance $B_{Fi}$ corresponding to an input color;
   converting the visible frequency into a audible frequency by following equation; and outputting the converted audible frequency in a sound:

$$f = f_l \times 2^{x + B_{Fi}}$$

wherein, $$x = \log_2\left(\frac{F_i}{F_l}\right) + C,$$

f is a audible frequency to be obtained, $f_1$ is a reference audible frequency, a positive number of x is a value of octave, $B_{Fi}$ is a luminance of $F_i$ and denotes a constant between $1 \leq B_{Fi} \leq 10$, and C is a constant and denotes a real number between $0 \leq C' \leq 1$ determined by the reference frequency.

26. An apparatus of converting a color into a sound, the apparatus comprising:
   input means for obtaining a visible frequency $F_i$ and a luminance $B_{Fi}$ corresponding to an input color;
   conversion means for converting the visible frequency into a audible frequency by following equation; and
   output means for outputting the converted audible frequency in a sound:

$$f = f_l \times 2^{x + B_{Fi}}$$

wherein, $$x = \log_2\left(\frac{F_i}{F_l}\right) + C,$$

f is a audible frequency to be obtained, $f_1$ is a reference audible frequency, a positive number of x is a value of octave, $B_{Fi}$ is a luminance of $F_i$ and denotes a constant between $1 \leq B_{Fi} \leq 10$, and C is a constant and denotes a real number between $0 \leq C' \leq 1$ determined by the reference frequency.

27. A method of selecting a position of a sound source, the method comprising the steps of:
   inputting a sound from the sound source through a number of channels spaced apart in a constant interval;

Fourier-transforming the inputted sound through each channel;

sampling a peak value of the Fourier-transformed signal; and operating a sound source generating position between a number of channels using a sound pressure of the plurality of channels at each sampled frequency according to the following equation:

$$I_{diff} = k\left(\frac{1}{s^2 + a^2} - \frac{1}{s^2 + (d-a)^2}\right)$$

wherein, a is a value of sound source generating position to be obtained by setting the sound source input position of the first channel to zero, d is a distance from the sound source input position of the first channel to the sound source input position of the second channel, s is a distance extending at right angle from a straight line extending between the sound source input positions of two channels to the actual sound source, k is a constant of k>0, and Idiff is a sound pressure value of the first channel minus a sound pressure value of the second channel at a particular peak.

28. A method of selecting a position of a sound source, the method comprising the steps of:

inputting a sound from the sound source through a number of channels spaced apart in a constant interval;

Fourier-transforming the inputted sound throuah each channel;

sampling a peak value of the Fourier-transformed signal; and operating a sound source generating position between the sound source input position of a number of channels as the following equation:

$E_{diff} = M1_{energy} - M2_{energy}$

If $E_{diff} > 0$, the sound source generating position is close to the first channel, If $E_{diff} < 0$, the sound source generating position is close to the second channel, Energy=$\Sigma(P_1^2 + P_2^2 + \ldots P_n^2)$ wherein, $E_{diff}$ is a value of the sound source generating position with the middle position between two channels being zero, $P_n$ is a value of sound pressure level having a detected peak, n is a number of detected peak, $M1_{energy}$ is a value of sound pressure energy of the first channel, and $M2_{energy}$ is a value of sound pressure energy of the second channel.

29. An apparatus of selecting a position of a sound source, the apparatus comprising:

means for inputting a sound from the sound source through a number of channels spaced apart in a constant interval;

means for Fourier-transforming the inputted sound through each channel;

means sampling a peak value of the Fourier-transformed signal; and means for operating a sound source generating position between a number of channels using a sound pressure of a number of channels at each sampled frequency peak according to the following eguation:

$$I_{diff} = k\left(\frac{1}{s^2 + a^2} - \frac{1}{s^2 + (d-a)^2}\right)$$

wherein, a is a value of sound source generating position to be obtained by setting the sound source input position of the first channel to zero, d is a distance from the sound source input position of the first channel to the sound source input position of the second channel, s is a distance extending at right angle from a straight line extending between the sound source input positions of two channels to the actual sound source, k is a constant of k>0, and Idiff is a sound pressure value of the first channel minus a sound pressure value of the second channel at a particular peak.

* * * * *